US008850114B2

(12) United States Patent
Rosenband et al.

(10) Patent No.: US 8,850,114 B2
(45) Date of Patent: Sep. 30, 2014

(54) STORAGE ARRAY CONTROLLER FOR FLASH-BASED STORAGE DEVICES

(76) Inventors: Daniel L Rosenband, Cambridge, MA (US); Michael John Sebastian Smith, Palo Alto, CA (US)

( * ) Notice: Subject to any disclaimer, the term of this patent is extended or adjusted under 35 U.S.C. 154(b) by 396 days.

(21) Appl. No.: 12/983,876

(22) Filed: Jan. 3, 2011

(65) Prior Publication Data

US 2012/0059978 A1    Mar. 8, 2012

Related U.S. Application Data

(63) Continuation-in-part of application No. 12/876,393, filed on Sep. 7, 2010, now abandoned.

(51) Int. Cl.
*G06F 12/02* (2006.01)

(52) U.S. Cl.
USPC .......................................................... 711/114

(58) Field of Classification Search
CPC ... G06F 3/0613; G06F 3/0659; G06F 3/0688; G06F 3/0689; G06F 12/0246; G06F 12/0253
See application file for complete search history.

(56) References Cited

U.S. PATENT DOCUMENTS

| | | | | |
|---|---|---|---|---|
| 4,506,323 A | 3/1985 | Pusic et al. | ..................... | 711/161 |
| 4,598,357 A | 7/1986 | Swenson et al. | ............... | 711/113 |
| 4,779,189 A | 10/1988 | Legvold et al. | ................. | 711/166 |
| 4,805,098 A | * 2/1989 | Mills et al. | ..................... | 711/118 |
| 4,875,155 A | 10/1989 | Iskiyan et al. | ................. | 711/113 |
| 4,916,605 A | 4/1990 | Beardsley et al. | ............. | 711/162 |
| 4,920,536 A | 4/1990 | Hammond et al. | ................ | 714/5 |
| 4,987,533 A | 1/1991 | Clark et al. | ............................. | 1/1 |
| 5,333,143 A | * 7/1994 | Blaum et al. | ..................... | 714/766 |
| 5,390,186 A | 2/1995 | Murata et al. | ................. | 711/113 |
| 5,404,500 A | 4/1995 | Legvold et al. | ..................... | 714/6 |
| 5,410,667 A | 4/1995 | Belsan et al. | ................. | 711/114 |
| 5,418,921 A | 5/1995 | Cortney et al. | ............... | 711/114 |
| 5,437,022 A | 7/1995 | Beardsley et al. | ................. | 714/6 |
| 5,526,511 A | 6/1996 | Swenson et al. | ............... | 711/134 |
| 5,542,066 A | 7/1996 | Mattson et al. | ............... | 711/136 |
| 5,544,343 A | 8/1996 | Swenson et al. | ............. | 711/133 |
| 5,551,003 A | 8/1996 | Mattson et al. | ............... | 711/136 |
| 5,568,628 A | 10/1996 | Satoh et al. | ..................... | 711/113 |
| 5,581,724 A | 12/1996 | Belsan et al. | ................. | 711/114 |
| 5,596,736 A | 1/1997 | Kerns et al. | ....................... | 711/4 |
| 5,627,990 A | 5/1997 | Cord et al. | .................... | 711/122 |
| 5,634,109 A | 5/1997 | Chen et al. | .................... | 711/143 |
| 5,636,359 A | 6/1997 | Beardsley et al. | ............ | 711/122 |
| 5,640,530 A | 6/1997 | Beardsley et al. | ............ | 711/113 |
| 5,682,527 A | 10/1997 | Cooper et al. | ......................... | 1/1 |
| 5,694,570 A | 12/1997 | Beardsley et al. | ............ | 711/113 |
| 5,696,932 A | 12/1997 | Smith et al. | ..................... | 711/118 |
| 5,715,424 A | 2/1998 | Jesionowski et al. | ........... | 714/24 |

(Continued)

OTHER PUBLICATIONS

U.S. Appl. No. 13/894,525, Response dated Aug. 4, 2014.

(Continued)

*Primary Examiner* — Hiep Nguyen

(57) ABSTRACT

The invention is an improved storage array controller that adds a level of indirection between host system and storage array. The storage array controller controls a storage array comprising at least one solid-state storage device. The storage array controller improvements include: garbage collection, sequentialization of writes, combining of writes, aggregation of writes, increased reliability, improved performance, and addition of resources and functions to a computer system with a storage subsystem.

9 Claims, 15 Drawing Sheets

(56) References Cited

U.S. PATENT DOCUMENTS

| | | | | |
|---|---|---|---|---|
| 5,717,884 A | 2/1998 | Gzym et al. | | 711/206 |
| 5,717,888 A | 2/1998 | Candelaria et al. | | 711/113 |
| 5,754,888 A | 5/1998 | Yang et al. | | 710/52 |
| 5,774,682 A | 6/1998 | Benhase et al. | | 711/118 |
| 5,778,426 A * | 7/1998 | DeKoning et al. | | 711/122 |
| 5,790,828 A | 8/1998 | Jost et al. | | 711/4 |
| 5,802,557 A | 9/1998 | Vishlitzky et al. | | 711/112 |
| 5,813,032 A | 9/1998 | Bhargava et al. | | 711/130 |
| 5,815,656 A | 9/1998 | Candelaria et al. | | 714/54 |
| 5,822,781 A | 10/1998 | Wells et al. | | 711/171 |
| 5,887,199 A | 3/1999 | Ofer et al. | | 710/65 |
| 5,892,978 A * | 4/1999 | Munguia et al. | | 710/33 |
| 5,893,164 A | 4/1999 | Legg et al. | | 711/156 |
| 5,900,009 A | 5/1999 | Vishlitzky et al. | | 711/113 |
| 5,930,481 A | 7/1999 | Benhase et al. | | 709/249 |
| 5,949,970 A | 9/1999 | Sipple et al. | | 714/15 |
| 6,003,114 A | 12/1999 | Bachmat et al. | | 711/113 |
| 6,006,342 A | 12/1999 | Beardsley et al. | | 714/5 |
| 6,016,530 A | 1/2000 | Auclair et al. | | 711/6 |
| 6,029,229 A | 2/2000 | Vishlitzky et al. | | 711/156 |
| 6,052,822 A | 4/2000 | Kim et al. | | 714/805 |
| 6,073,209 A | 6/2000 | Bergsten et al. | | 711/114 |
| 6,098,191 A | 8/2000 | Yamamoto et al. | | 714/766 |
| 6,101,588 A | 8/2000 | Farley et al. | | 711/168 |
| 6,119,209 A | 9/2000 | Bauman et al. | | 711/162 |
| 6,141,731 A | 10/2000 | Beardsley et al. | | 711/136 |
| 6,157,991 A | 12/2000 | Arnon et al. | | 711/161 |
| 6,189,080 B1 | 2/2001 | Ofer et al. | | 711/167 |
| 6,192,450 B1 | 2/2001 | Bauman et al. | | 711/135 |
| 6,219,289 B1 | 4/2001 | Satoh et al. | | 365/201 |
| 6,243,795 B1 | 6/2001 | Yang et al. | | 711/159 |
| 6,256,705 B1 | 7/2001 | Li et al. | | 711/112 |
| 6,272,662 B1 | 8/2001 | Jadav et al. | | 714/805 |
| 6,275,897 B1 | 8/2001 | Bachmat et al. | | 711/114 |
| 6,311,252 B1 | 10/2001 | Raz et al. | | 711/117 |
| 6,330,655 B1 | 12/2001 | Vishlitzky et al. | | 711/208 |
| 6,332,197 B1 | 12/2001 | Jadav et al. | | 714/6 |
| 6,336,164 B1 | 1/2002 | Gerdt et al. | | 711/113 |
| 6,341,331 B1 | 1/2002 | McNutt et al. | | 711/113 |
| 6,370,534 B1 | 4/2002 | Odom et al. | | 1/1 |
| 6,393,426 B1 | 5/2002 | Odom et al. | | 707/100 |
| 6,408,370 B2 | 6/2002 | Yamamoto et al. | | 711/167 |
| 6,425,050 B1 | 7/2002 | Beardsley et al. | | 711/113 |
| 6,427,184 B1 | 7/2002 | Kaneko et al. | | 711/4 |
| 6,442,659 B1 | 8/2002 | Blumenau et al. | | 711/114 |
| 6,446,141 B1 | 9/2002 | Nolan et al. | | 710/8 |
| 6,463,503 B1 | 10/2002 | Jones et al. | | 711/114 |
| 6,467,022 B1 | 10/2002 | Buckland et al. | | 711/113 |
| 6,473,830 B2 | 10/2002 | Li et al. | | 711/112 |
| 6,480,936 B1 | 11/2002 | Ban et al. | | 711/118 |
| 6,484,234 B1 | 11/2002 | Kedem et al. | | 711/113 |
| 6,490,664 B1 | 12/2002 | Jones et al. | | 711/154 |
| 6,513,097 B1 | 1/2003 | Beardsley et al. | | 711/113 |
| 6,513,102 B2 | 1/2003 | Garrett et al. | | 711/165 |
| 6,516,320 B1 | 2/2003 | Odom et al. | | 707/101 |
| 6,567,888 B2 | 5/2003 | Kedem et al. | | 711/113 |
| 6,587,921 B2 | 7/2003 | Chiu et al. | | 711/119 |
| 6,591,335 B1 | 7/2003 | Sade et al. | | 711/113 |
| 6,594,726 B1 | 7/2003 | Vishlitzky et al. | | 711/113 |
| 6,604,171 B1 | 8/2003 | Sade et al. | | 711/113 |
| 6,615,318 B2 | 9/2003 | Jarvis et al. | | 711/133 |
| 6,615,332 B2 | 9/2003 | Yamamoto et al. | | 711/167 |
| 6,629,199 B1 | 9/2003 | Vishlitzky et al. | | 711/113 |
| 6,654,830 B1 | 11/2003 | Taylor et al. | | 710/74 |
| 6,658,542 B2 | 12/2003 | Beardsley et al. | | 711/162 |
| 6,684,289 B1 | 1/2004 | Gonzalez et al. | | 711/103 |
| 6,704,837 B2 | 3/2004 | Beardsley et al. | | 711/114 |
| 6,757,790 B2 | 6/2004 | Chalmer et al. | | 711/147 |
| 6,766,414 B2 | 7/2004 | Francis et al. | | 711/113 |
| 6,775,738 B2 | 8/2004 | Ash et al. | | 711/113 |
| 6,782,444 B1 | 8/2004 | Vishlitzky et al. | | 711/4 |
| 6,785,771 B2 | 8/2004 | Ash et al. | | 711/136 |
| 6,842,843 B1 | 1/2005 | Vishlitzky et al. | | 711/209 |
| 6,857,050 B2 | 2/2005 | Lee et al. | | 711/141 |
| 6,865,648 B1 | 3/2005 | Naamad et al. | | 711/133 |
| 6,871,272 B2 | 3/2005 | Butterworth et al. | | 711/167 |
| 6,948,009 B2 | 9/2005 | Jarvis et al. | | 710/17 |
| 6,948,033 B2 | 9/2005 | Ninose et al. | | 711/122 |
| 6,957,302 B2 | 10/2005 | Fairchild et al. | | 711/113 |
| 6,965,979 B2 | 11/2005 | Burton et al. | | 711/202 |
| 6,993,627 B2 | 1/2006 | Butterworth et al. | | 711/122 |
| 6,996,690 B2 | 2/2006 | Nakamura et al. | | 711/162 |
| 7,007,196 B2 | 2/2006 | Lee et al. | | 714/9 |
| 7,024,530 B2 | 4/2006 | Jarvis et al. | | 711/162 |
| 7,032,065 B2 | 4/2006 | Gonzalez et al. | | 711/103 |
| 7,051,174 B2 | 5/2006 | Ash et al. | | 711/162 |
| 7,055,009 B2 | 5/2006 | Factor et al. | | 711/162 |
| 7,058,764 B2 | 6/2006 | Bearden et al. | | 711/129 |
| 7,080,207 B2 | 7/2006 | Bergsten et al. | | 711/135 |
| 7,080,208 B2 | 7/2006 | Ashmore et al. | | 711/136 |
| 7,080,232 B2 | 7/2006 | Aasheim et al. | | 711/205 |
| 7,085,892 B2 | 8/2006 | Martinez et al. | | 711/133 |
| 7,085,907 B2 | 8/2006 | Ash et al. | | 711/170 |
| 7,089,357 B1 | 8/2006 | Ezra et al. | | 711/113 |
| 7,103,717 B2 | 9/2006 | Abe et al. | | 711/114 |
| 7,107,403 B2 | 9/2006 | Modha et al. | | 711/129 |
| 7,124,128 B2 | 10/2006 | Springer et al. | | 707/3 |
| 7,124,243 B2 | 10/2006 | Burton et al. | | 711/113 |
| 7,130,956 B2 | 10/2006 | Rao et al. | | 711/3 |
| 7,130,957 B2 | 10/2006 | Rao et al. | | 711/3 |
| 7,136,966 B2 | 11/2006 | Hetrick et al. | | 711/122 |
| 7,139,933 B2 | 11/2006 | Hsu et al. | | 714/6 |
| 7,159,139 B2 | 1/2007 | Vishlitzky et al. | | 714/6 |
| 7,171,513 B2 | 1/2007 | Gonzalez et al. | | 711/103 |
| 7,171,516 B2 | 1/2007 | Lowe et al. | | 711/113 |
| 7,171,610 B2 | 1/2007 | Ash et al. | | 714/799 |
| 7,191,207 B2 | 3/2007 | Blount et al. | | 709/200 |
| 7,191,303 B2 | 3/2007 | Yamamoto et al. | | 711/167 |
| 7,191,306 B2 | 3/2007 | Myoung et al. | | 711/203 |
| 7,213,110 B2 | 5/2007 | Nakayama et al. | | 711/143 |
| 7,216,199 B2 | 5/2007 | Mizuno et al. | | 711/114 |
| 7,216,208 B2 | 5/2007 | Yamamoto et al. | | 711/162 |
| 7,253,981 B2 | 8/2007 | Ng et al. | | 360/48 |
| 7,254,686 B2 | 8/2007 | Islam et al. | | 711/162 |
| 7,266,653 B2 | 9/2007 | Tross et al. | | 711/162 |
| 7,269,690 B2 | 9/2007 | Abe et al. | | 711/114 |
| 7,275,134 B2 | 9/2007 | Yang et al. | | 711/122 |
| 7,293,048 B2 | 11/2007 | Cochran et al. | | 1/1 |
| 7,293,137 B2 | 11/2007 | Factor et al. | | 711/113 |
| 7,299,411 B2 | 11/2007 | Blair et al. | | 715/243 |
| 7,318,118 B2 | 1/2008 | Chu et al. | | 711/103 |
| 7,360,019 B2 | 4/2008 | Abe et al. | | 711/114 |
| 7,366,846 B2 | 4/2008 | Boyd et al. | | 711/144 |
| 7,380,058 B2 | 5/2008 | Kanai et al. | | 711/113 |
| 7,380,059 B2 | 5/2008 | Burton et al. | | 711/113 |
| 7,395,377 B2 | 7/2008 | Gill et al. | | 711/143 |
| 7,411,757 B2 | 8/2008 | Chu et al. | | 360/69 |
| 7,421,535 B2 | 9/2008 | Jarvis et al. | | 711/113 |
| 7,421,552 B2 | 9/2008 | Long et al. | | 711/162 |
| 7,426,623 B2 | 9/2008 | Lasser et al. | | 711/170 |
| 7,437,515 B1 | 10/2008 | Naamad et al. | | 711/133 |
| 7,447,843 B2 | 11/2008 | Ishikawa et al. | | 711/129 |
| 7,454,656 B2 | 11/2008 | Okada et al. | | 714/22 |
| 7,464,221 B2 | 12/2008 | Nakamura et al. | | 711/113 |
| 7,472,222 B2 | 12/2008 | Auerbach et al. | | 711/112 |
| 7,496,714 B2 | 2/2009 | Gill et al. | | 711/143 |
| 7,500,050 B2 | 3/2009 | Gill et al. | | 711/113 |
| 7,539,815 B2 | 5/2009 | Zohar et al. | | 711/112 |
| 7,543,109 B1 | 6/2009 | Bell et al. | | 711/113 |
| 7,565,485 B2 | 7/2009 | Factor et al. | | 711/113 |
| 7,574,556 B2 | 8/2009 | Gill et al. | | 711/113 |
| 7,577,787 B1 | 8/2009 | Yochai et al. | | 711/113 |
| 7,581,063 B2 | 8/2009 | Factor et al. | | 711/118 |
| 7,594,023 B2 * | 9/2009 | Gemmell | | 709/230 |
| 7,624,229 B1 | 11/2009 | Longinov et al. | | 711/113 |
| 7,627,714 B2 | 12/2009 | Ash et al. | | 711/113 |
| 7,650,480 B2 * | 1/2010 | Jiang | | 711/165 |
| 7,657,707 B2 | 2/2010 | Yamamoto et al. | | 711/121 |
| 7,660,948 B2 | 2/2010 | Bates et al. | | 711/117 |
| 7,676,633 B1 | 3/2010 | Fair et al. | | 711/133 |
| 7,680,982 B2 | 3/2010 | Ash et al. | | 711/113 |
| 7,689,769 B2 | 3/2010 | Bates et al. | | 711/117 |
| 7,689,869 B2 | 3/2010 | Terashita et al. | | 714/42 |
| 8,055,938 B1 * | 11/2011 | Chatterjee et al. | | 714/6.24 |

(56) References Cited

U.S. PATENT DOCUMENTS

| | | | |
|---|---|---|---|
| 8,214,607 B2* | 7/2012 | Williams | 711/154 |
| 8,275,933 B2* | 9/2012 | Flynn et al. | 711/103 |
| 2001/0029570 A1 | 10/2001 | Yamamoto et al. | 711/113 |
| 2002/0004885 A1 | 1/2002 | Francis et al. | 711/118 |
| 2002/0032835 A1 | 3/2002 | Li et al. | 711/114 |
| 2002/0035666 A1 | 3/2002 | Beardsley et al. | 711/114 |
| 2002/0073277 A1 | 6/2002 | Butterworth et al. | 711/113 |
| 2002/0073285 A1 | 6/2002 | Butterworth et al. | 711/154 |
| 2002/0124138 A1 | 9/2002 | Garrett et al. | 711/113 |
| 2002/0129202 A1 | 9/2002 | Yamamoto et al. | 711/113 |
| 2002/0194429 A1 | 12/2002 | Chiu et al. | 711/118 |
| 2003/0028724 A1 | 2/2003 | Kedem et al. | 711/113 |
| 2003/0037204 A1 | 2/2003 | Ash et al. | 711/113 |
| 2003/0070041 A1 | 4/2003 | Beardsley et al. | 711/113 |
| 2003/0105928 A1 | 6/2003 | Ash et al. | 711/136 |
| 2003/0140198 A1 | 7/2003 | Ninose et al. | 711/122 |
| 2003/0149843 A1 | 8/2003 | Jarvis et al. | 711/133 |
| 2003/0158999 A1 | 8/2003 | Hauck et al. | 711/113 |
| 2003/0159001 A1 | 8/2003 | Chalmer et al. | 711/120 |
| 2003/0167252 A1 | 9/2003 | Odom et al. | 1/1 |
| 2003/0204677 A1 | 10/2003 | Bergsten et al. | 711/144 |
| 2003/0225948 A1 | 12/2003 | Jarvis et al. | 710/17 |
| 2003/0229767 A1 | 12/2003 | Lee et al. | 711/154 |
| 2003/0229826 A1 | 12/2003 | Lee et al. | 714/42 |
| 2003/0233613 A1 | 12/2003 | Ash et al. | 714/799 |
| 2004/0019740 A1 | 1/2004 | Nakayama et al. | 711/113 |
| 2004/0049638 A1 | 3/2004 | Ashmore et al. | 711/136 |
| 2004/0059870 A1 | 3/2004 | Ash et al. | 711/119 |
| 2004/0085849 A1 | 5/2004 | Myoung et al. | 365/232 |
| 2004/0088484 A1 | 5/2004 | Yamamoto et al. | 711/114 |
| 2004/0123028 A1 | 6/2004 | Kanai et al. | 711/113 |
| 2004/0133855 A1 | 7/2004 | Blair et al. | 715/249 |
| 2004/0148486 A1 | 7/2004 | Burton et al. | 711/202 |
| 2004/0181639 A1 | 9/2004 | Jarvis et al. | 711/161 |
| 2004/0181640 A1 | 9/2004 | Factor et al. | 711/162 |
| 2004/0186968 A1 | 9/2004 | Factor et al. | 711/162 |
| 2004/0199737 A1 | 10/2004 | Yamamoto et al. | 711/167 |
| 2004/0205296 A1 | 10/2004 | Bearden et al. | 711/129 |
| 2004/0205297 A1 | 10/2004 | Bearden et al. | 711/133 |
| 2004/0230737 A1 | 11/2004 | Burton et al. | 711/3 |
| 2004/0255026 A1 | 12/2004 | Blount et al. | 709/226 |
| 2004/0260735 A1 | 12/2004 | Martinez et al. | 1/1 |
| 2004/0260882 A1 | 12/2004 | Martinez et al. | 711/133 |
| 2004/0267706 A1 | 12/2004 | Springer et al. | 1/1 |
| 2004/0267902 A1 | 12/2004 | Yang et al. | 709/217 |
| 2005/0005188 A1 | 1/2005 | Hsu et al. | 714/2 |
| 2005/0021906 A1 | 1/2005 | Nakamura et al. | 711/113 |
| 2005/0071549 A1 | 3/2005 | Tross et al. | 711/113 |
| 2005/0071550 A1 | 3/2005 | Lowe et al. | 711/113 |
| 2005/0071599 A1 | 3/2005 | Modha et al. | 711/170 |
| 2005/0102553 A1 | 5/2005 | Cochran et al. | 714/6 |
| 2005/0120168 A1 | 6/2005 | Vishlitzky et al. | 711/112 |
| 2005/0177687 A1 | 8/2005 | Rao et al. | 711/118 |
| 2005/0193240 A1 | 9/2005 | Ash et al. | 714/7 |
| 2005/0198411 A1 | 9/2005 | Bakke et al. | 710/22 |
| 2005/0228941 A1 | 10/2005 | Abe et al. | 711/113 |
| 2005/0228954 A1 | 10/2005 | Factor et al. | 711/134 |
| 2005/0240809 A1 | 10/2005 | Ash et al. | 714/8 |
| 2005/0251628 A1 | 11/2005 | Jarvis et al. | 711/136 |
| 2005/0270843 A1 | 12/2005 | Koren et al. | 365/185.11 |
| 2005/0273555 A1 | 12/2005 | Factor et al. | 711/113 |
| 2006/0004957 A1 | 1/2006 | Hand et al. | 711/113 |
| 2006/0020855 A1 | 1/2006 | Okada et al. | 714/14 |
| 2006/0031639 A1 | 2/2006 | Benhase et al. | 711/122 |
| 2006/0069888 A1 | 3/2006 | Martinez et al. | 711/162 |
| 2006/0080501 A1 | 4/2006 | Auerbach et al. | 711/112 |
| 2006/0106891 A1 | 5/2006 | Mahar et al. | 1/1 |
| 2006/0161700 A1 | 7/2006 | Boyd et al. | 710/61 |
| 2006/0168403 A1 | 7/2006 | Kolovson et al. | 711/142 |
| 2006/0184740 A1 | 8/2006 | Ishikawa et al. | 711/129 |
| 2006/0224849 A1 | 10/2006 | Rezaul et al. | 711/170 |
| 2006/0265568 A1 | 11/2006 | Burton et al. | 711/216 |
| 2006/0294301 A1 | 12/2006 | Zohar et al. | 711/113 |
| 2007/0033356 A1* | 2/2007 | Erlikhman | 711/162 |
| 2007/0038833 A1 | 2/2007 | Yamamoto et al. | 711/167 |
| 2007/0050571 A1 | 3/2007 | Nakamura et al. | 711/154 |
| 2007/0094446 A1 | 4/2007 | Sone et al. | 711/113 |
| 2007/0118695 A1 | 5/2007 | Lowe et al. | 711/136 |
| 2007/0180328 A1* | 8/2007 | Cornwell et al. | 714/42 |
| 2007/0186047 A1 | 8/2007 | Jarvis et al. | 711/136 |
| 2007/0220200 A1 | 9/2007 | Gill et al. | 711/113 |
| 2007/0220201 A1 | 9/2007 | Gill et al. | 711/113 |
| 2007/0245080 A1 | 10/2007 | Abe et al. | 711/113 |
| 2007/0250660 A1 | 10/2007 | Gill et al. | 711/103 |
| 2007/0260846 A1 | 11/2007 | Burton et al. | 711/216 |
| 2007/0288710 A1 | 12/2007 | Boyd et al. | 711/162 |
| 2007/0300008 A1 | 12/2007 | Rogers et al. | 711/103 |
| 2008/0010411 A1 | 1/2008 | Yang et al. | 711/122 |
| 2008/0021853 A1 | 1/2008 | Modha et al. | 706/44 |
| 2008/0024899 A1 | 1/2008 | Chu et al. | 360/69 |
| 2008/0040553 A1* | 2/2008 | Ash et al. | 711/133 |
| 2008/0052456 A1 | 2/2008 | Ash et al. | 711/113 |
| 2008/0065669 A1 | 3/2008 | Factor et al. | 1/1 |
| 2008/0071971 A1 | 3/2008 | Kim et al. | 711/103 |
| 2008/0071993 A1 | 3/2008 | Factor et al. | 711/133 |
| 2008/0091875 A1 | 4/2008 | Mannenbach et al. | 711/113 |
| 2008/0104193 A1 | 5/2008 | Mimatsu et al. | 709/214 |
| 2008/0126708 A1 | 5/2008 | Gill et al. | 711/118 |
| 2008/0137284 A1 | 6/2008 | Flynn et al. | 361/679.32 |
| 2008/0140724 A1 | 6/2008 | Flynn et al. | 1/1 |
| 2008/0140909 A1 | 6/2008 | Flynn et al. | 711/100 |
| 2008/0140910 A1 | 6/2008 | Flynn et al. | 711/100 |
| 2008/0140932 A1 | 6/2008 | Flynn et al. | 711/114 |
| 2008/0141043 A1 | 6/2008 | Flynn et al. | 713/193 |
| 2008/0155190 A1 | 6/2008 | Ash et al. | 711/114 |
| 2008/0155198 A1 | 6/2008 | Factor et al. | 711/143 |
| 2008/0168220 A1 | 7/2008 | Gill et al. | 711/113 |
| 2008/0168234 A1 | 7/2008 | Gill et al. | 711/134 |
| 2008/0168304 A1 | 7/2008 | Flynn et al. | 714/7 |
| 2008/0183882 A1 | 7/2008 | Flynn et al. | 709/229 |
| 2008/0183953 A1 | 7/2008 | Flynn et al. | 711/103 |
| 2008/0195807 A1 | 8/2008 | Kubo et al. | 711/114 |
| 2008/0201523 A1 | 8/2008 | Ash et al. | 711/113 |
| 2008/0225474 A1 | 9/2008 | Flynn et al. | 361/807 |
| 2008/0229010 A1 | 9/2008 | Maeda et al. | 711/113 |
| 2008/0229079 A1 | 9/2008 | Flynn et al. | 712/220 |
| 2008/0250200 A1 | 10/2008 | Jarvis et al. | 711/113 |
| 2008/0250210 A1 | 10/2008 | Ash et al. | 711/141 |
| 2008/0256183 A1 | 10/2008 | Flynn et al. | 709/204 |
| 2008/0256286 A1 | 10/2008 | Ash et al. | 711/6 |
| 2008/0256292 A1 | 10/2008 | Flynn et al. | 711/114 |
| 2008/0259418 A1 | 10/2008 | Bates et al. | 359/5 |
| 2008/0259764 A1 | 10/2008 | Bates et al. | 369/103 |
| 2008/0259765 A1 | 10/2008 | Bates et al. | 369/103 |
| 2008/0270692 A1 | 10/2008 | Cochran et al. | 711/114 |
| 2008/0295102 A1 | 11/2008 | Akaike et al. | 718/102 |
| 2008/0307192 A1 | 12/2008 | Sinclair et al. | 711/218 |
| 2008/0313312 A1 | 12/2008 | Flynn et al. | 709/221 |
| 2008/0313364 A1 | 12/2008 | Flynn et al. | 710/31 |
| 2009/0043961 A1 | 2/2009 | Nakamura et al. | 711/113 |
| 2009/0077312 A1 | 3/2009 | Miura et al. | 711/113 |
| 2009/0113112 A1 | 4/2009 | Ye et al. | 711/102 |
| 2009/0125671 A1 | 5/2009 | Flynn et al. | 711/103 |
| 2009/0132760 A1 | 5/2009 | Flynn et al. | 711/113 |
| 2009/0150605 A1 | 6/2009 | Flynn et al. | 711/112 |
| 2009/0150641 A1 | 6/2009 | Flynn et al. | 711/202 |
| 2009/0150744 A1 | 6/2009 | Flynn et al. | 714/752 |
| 2009/0150894 A1 | 6/2009 | Huang et al. | 718/104 |
| 2009/0157950 A1 | 6/2009 | Selinger et al. | 711/103 |
| 2009/0168525 A1 | 7/2009 | Olbrich et al. | 365/185.11 |
| 2009/0172257 A1 | 7/2009 | Prins et al. | 711/103 |
| 2009/0172258 A1 | 7/2009 | Olbrich et al. | 711/103 |
| 2009/0172259 A1 | 7/2009 | Prins et al. | 711/103 |
| 2009/0172260 A1 | 7/2009 | Olbrich et al. | 711/103 |
| 2009/0172261 A1 | 7/2009 | Prins et al. | 711/103 |
| 2009/0172262 A1 | 7/2009 | Olbrich et al. | 711/103 |
| 2009/0172263 A1 | 7/2009 | Olbrich et al. | 711/103 |
| 2009/0172308 A1 | 7/2009 | Prins et al. | 711/103 |
| 2009/0172499 A1 | 7/2009 | Olbrich et al. | 714/773 |
| 2009/0182932 A1 | 7/2009 | Tan et al. | 711/103 |
| 2009/0193184 A1 | 7/2009 | Yu et al. | 711/103 |
| 2009/0198885 A1* | 8/2009 | Manoj | 711/114 |
| 2009/0204872 A1 | 8/2009 | Yu et al. | 714/773 |
| 2009/0216944 A1 | 8/2009 | Gill et al. | 711/113 |

(56) References Cited

U.S. PATENT DOCUMENTS

| | | | |
|---|---|---|---|
| 2009/0216954 A1 | 8/2009 | Benhase et al. | 711/133 |
| 2009/0222596 A1 | 9/2009 | Flynn et al. | 710/22 |
| 2009/0222617 A1 | 9/2009 | Yano et al. | 711/103 |
| 2009/0222621 A1 | 9/2009 | Ash et al. | 711/112 |
| 2009/0222643 A1 | 9/2009 | Chu et al. | 711/209 |
| 2009/0228637 A1 | 9/2009 | Moon et al. | 711/103 |
| 2009/0228660 A1 | 9/2009 | Edwards et al. | 711/133 |
| 2009/0259800 A1* | 10/2009 | Kilzer et al. | 711/103 |
| 2009/0282301 A1 | 11/2009 | Flynn et al. | 714/710 |
| 2009/0287956 A1 | 11/2009 | Flynn et al. | 714/6 |
| 2009/0300298 A1 | 12/2009 | Ash et al. | 711/156 |
| 2009/0300408 A1 | 12/2009 | Ash et al. | 714/5 |
| 2009/0307416 A1 | 12/2009 | Luo et al. | 711/103 |
| 2009/0327603 A1* | 12/2009 | McKean et al. | 711/114 |
| 2010/0017556 A1 | 1/2010 | Chin et al. | 711/103 |
| 2010/0049902 A1 | 2/2010 | Kakihara et al. | 711/103 |
| 2010/0082882 A1 | 4/2010 | Im et al. | 711/103 |
| 2010/0082917 A1 | 4/2010 | Yang et al. | 711/157 |
| 2010/0082931 A1 | 4/2010 | Hatfield et al. | 711/166 |
| 2010/0088463 A1 | 4/2010 | Im et al. | 711/103 |
| 2010/0088482 A1 | 4/2010 | Hinz et al. | 711/166 |
| 2010/0174853 A1* | 7/2010 | Lee et al. | 711/103 |
| 2010/0235569 A1* | 9/2010 | Nishimoto et al. | 711/103 |
| 2011/0060863 A1* | 3/2011 | Kimura et al. | 711/103 |
| 2011/0093648 A1* | 4/2011 | Belluomini et al. | 711/103 |
| 2011/0138113 A1* | 6/2011 | Leach et al. | 711/103 |
| 2011/0145306 A1* | 6/2011 | Boyd et al. | 707/824 |
| 2011/0231594 A1* | 9/2011 | Sugimoto et al. | 711/103 |
| 2012/0151130 A1* | 6/2012 | Merry et al. | 711/103 |
| 2012/0151254 A1* | 6/2012 | Horn | 714/6.22 |
| 2012/0198127 A1* | 8/2012 | Lan et al. | 711/103 |

OTHER PUBLICATIONS

Yoon Jae Seong et al, Hydra: A Block-Mapped Parallel Flash Memory Solid State Disk Architecture, IEEE Transactions on Computers, vol. 59, No. 7, Jul. 2010.

Jeong-Uk Kang et al, A Superblock-based Flash Translation Layer for NAND Flash Memory, Oct. 2006.

Machine Translation for Korean Application KR1020080127633. Applicant INDILINX Co (Jan. 2007-050237-1). Inventor Su-Gil Jeong. Document Date Dec. 16, 2008.

* cited by examiner

STORAGE ARRAY CONTROLLER FOR FLASH-BASED STORAGE DEVICES

CROSS-REFERENCE TO RELATED APPLICATIONS

This application is a continuation-in-part of U.S. non-provisional patent application Ser. No. 12/876,393, filed Sep. 7, 2010.

U.S. non-provisional patent application Ser. No. 12/876,393 is incorporated herein by reference in its entirety and in its description includes information (e.g. definitions of special terms, illustrative examples, data, other information, etc.) that may be relevant to this application.

If any definitions (e.g. figure reference signs, specialized terms, examples, data, information, etc.) from any related material (e.g. parent application, other related application, material incorporated by reference, material cited, extrinsic reference, etc.) conflict with this application (e.g. abstract, description, summary, claims, etc.) for any purpose (e.g. prosecution, claim support, claim interpretation, claim construction, etc.), then the definitions in this application shall apply.

BACKGROUND OF THE INVENTION

1. Field of the Invention

The present invention relates generally to US Classification 711/216. The present invention relates to an improved storage array controller for flash-based storage devices.

2. Description of the Related Art

U.S. Pat. No. 6,480,936 describes a cache control unit for a storage apparatus.

U.S. Pat. No. 7,574,556 and U.S. Pat. No. 7,500,050 describe destaging of writes in a non-volatile cache.

U.S. Pat. No. 7,253,981 describes the re-ordering of writes in a disk controller.

U.S. Pat. No. 6,957,302 describes the use of a write stack drive in combination with a normal drive.

U.S. Pat. No. 5,893,164 describes a method of tracking incomplete writes in a disk array.

U.S. Pat. No. 6,219,289 describes a data writing apparatus for a tester to write data to a plurality of electric devices.

U.S. Pat. No. 7,318,118 describes a disk drive controller that completes some writes to flash memory of a hard disk drive for subsequent de-staging to the disk, whereas for other writes the data is written directly to disk.

U.S. Pat. No. 6,427,184 describes a disk controller that detects a sequential I/O stream from a host computer.

U.S. Pat. No. 7,216,199 describes a storage controller that continuously writes write-requested data to a stripe on a disk without using a write buffer.

US Publication 2008/0307192 describes storage address re-mapping.

BRIEF SUMMARY OF THE INVENTION

The invention is an improved storage array controller that adds a level of indirection between host system and storage array. The storage array controller controls a storage array comprising at least one solid-state storage device. The storage array controller improvements include: garbage collection, sequentialization of writes, combining of writes, aggregation of writes, increased reliability, improved performance, and addition of resources and functions to a computer system with a storage subsystem.

BRIEF DESCRIPTION OF THE SEVERAL VIEWS OF THE DRAWINGS

So that the features of the present invention can be understood, a more detailed description of the invention, briefly summarized above, may be had by reference to typical embodiments, some of which are illustrated in the accompanying drawings. It is to be noted, however, that the accompanying drawings illustrate only typical embodiments of this invention and are therefore not to be considered limiting of the scope of the invention, for the invention may admit to other equally effective embodiments. The following detailed description makes reference to the accompanying drawings that are now briefly described.

Figure 1:
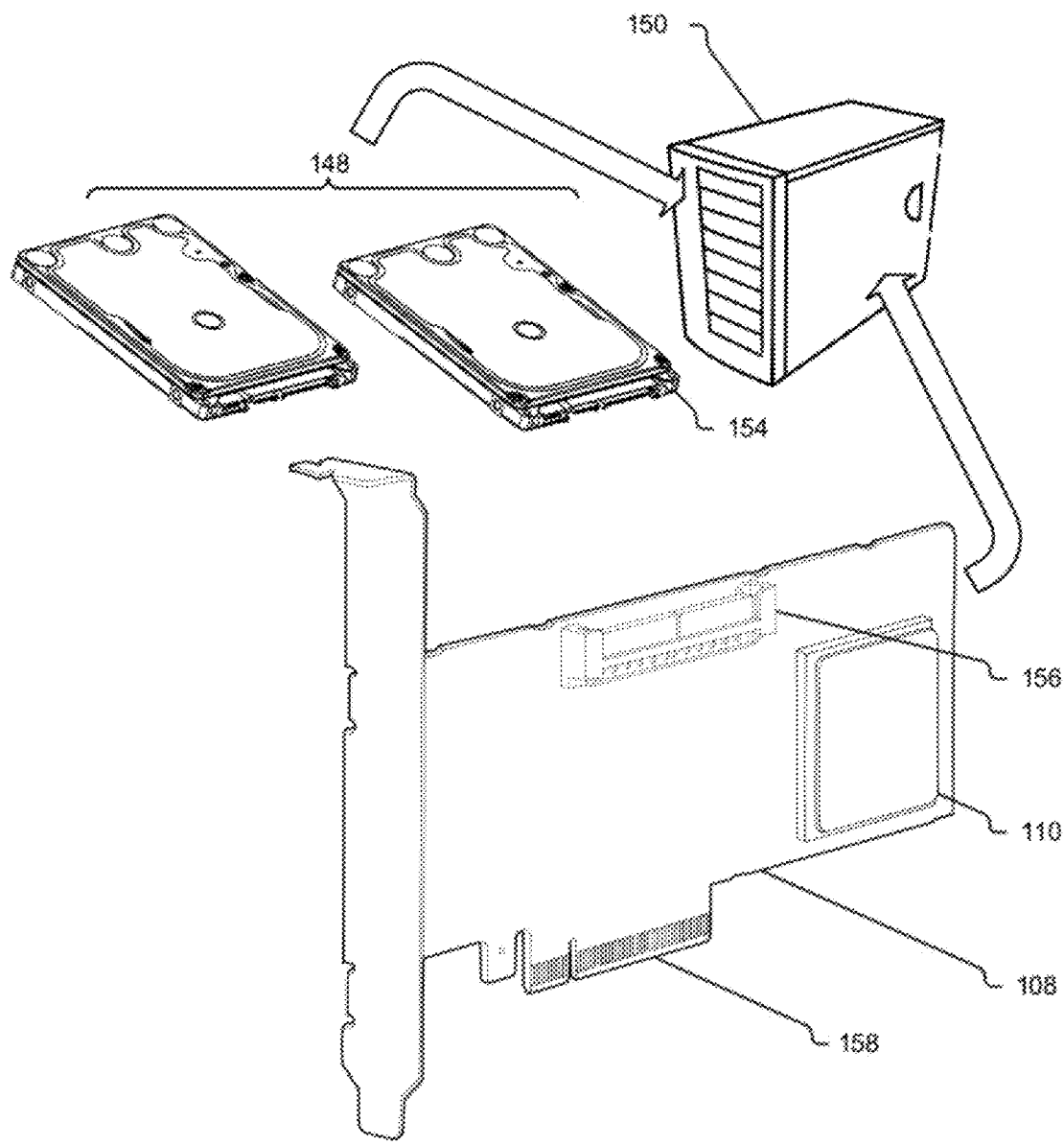
FIG. 1 (not to scale) shows an embodiment of a storage array controller and computer system with a storage array comprising two storage devices.

While the invention is susceptible to various modifications, combinations, and alternative forms, specific embodiments thereof are shown by way of example in the drawings and will herein be described in detail. It should be understood, however, that the accompanying drawings and detailed description are not intended to limit the invention to the particular form disclosed, but on the contrary, the intention is to cover all modifications, combinations, equivalents and alternatives falling within the spirit and scope of the present invention as defined by the accompanying claims.

DETAILED DESCRIPTION OF THE INVENTION

Glossary and Conventions

Terms that are special to the field of the invention or specific to this description are defined in this description and the first use of such special terms (which normally includes the definition of that term) is highlighted in italics for the convenience of the reader. Table 1 shows a glossary, also for the convenience of the reader. If any information from Table 1 used for claim interpretation or other purpose conflict with the description text, figures or other tables, then the information in the description shall apply.

In this description there are several figures that depict similar structures with similar parts or components. Thus, as an example, to avoid confusion a disk command in FIG. 1 may be labeled "Disk Command (1)" and a similar, but not identical, disk command in FIG. 2 is labeled "Disk Command (2)", etc.

TABLE 1

Glossary of Terms

| Term | Description |
|---|---|
| aba_free | A data structure used to hold free ABAs. |
| Aggregate | The combining of Over-Writes. |
| Array Block Address (ABA) | A disk address, the combination of D and DBA. |
| Balance | Direct or steer write commands. |
| Battery-Backed Write Cache (BBWC) | A write cache for a Storage Array that can retain data on power loss. |
| Block | A region of a flash memory. (Also an alternative term for Sector.) |
| Block Write | A write to a block of flash memory. |
| Boot Sector | A part of a Storage Device used to store boot information. |
| Byte Offset | Offset from start of a file measured in bytes. |
| Cache | Memory used to hold data so it may be accessed more quickly. |
| Clean | A part of a flash memory that stores data. See also Dirty. |
| Cluster | A region of a Storage Device. See Disk Cluster. |
| Command (CMD) | A read, write or other command directed to a Storage Device. |
| Command Number | A unique number to identify a command. |
| Command Set | The complete set of commands used by a standard such as ATA or SCSI. |
| Composite | A programming structure created by joining one or more other fields or structures. |
| Convert | Translation of logical address to physical address by the disk controller (cf. Map). |
| Data Portion | The portion of a Disk Volume that stores data. |
| Data Range | Part of a Command that specifies a range of addresses. |
| Data Section | A portion of the Master File Table. |
| Directed | A Command is directed at a Storage Device or at a Storage Array Controller. |
| Dirty | Data in flash memory that is no longer valid or required. |
| Disk Block Size (DBS) | The block or sector size of the physical Storage Device (cf. HBS). |
| Disk Cluster | A term used by NTFS that represents part of a Storage Device. |
| Disk Command | The storage command as received by a Storage Device. |
| Disk Command Number | A unique number to identify a Disk Command. |
| Disk Controller | The logic on a Storage Device (cf. Storage Array Controller). |
| Disk Group | A collection of Storage Devices in a RAID array. |
| Disk Logical Block Address (DBA) | The LBA that identifies the sector (or block) on a Storage Device. |
| Disk Number (D) | A field that identifies a Storage Device. |
| Disk Pool | A collection of Storage Devices that may be treated as a single Storage Device. |
| Disk Trim Command | A command that identifies area on a Storage Device that is no longer required. |
| Disk Write | A storage command that writes data to a Storage Device. |
| Extent | NTFS manages Disk Clusters using an Extent. |
| Field | Part of a data structure or a Storage Command. |
| File Allocation Table (FAT) | A data structure used by the Microsoft Windows filesystem. |
| Filename | The name of a file that holds data stored on a Storage Device. |
| Flash Block | A portion of a flash memory chip. |
| Flash Page | A portion of a flash memory chip. |
| Flash-Based Storage Device | A Storage Device that uses flash or similar memory. |
| Free Block (FB) | A portion of a flash memory chip that is available to be used. |
| Free Superblock | A Superblock containing Free Blocks. |
| Freelist | A list of free blocks or sectors. |
| Garbage | A portion of flash memory that is no longer required. |

TABLE 1-continued

Glossary of Terms

| Term | Description |
| --- | --- |
| Garbage (G) | A value in a data structure that indicates a block or sector is ready to be erased. |
| Garbage Collection | Copying pages to new blocks and erasing old blocks. |
| Granularity | An amount of storage (e.g. 512 bytes). |
| Hard Disk (HD) | A mechanical disk, also Hard Disk Drive (HDD). |
| Hard-Disk Drive (HDD) | A mechanical disk, also Hard Disk (HD). |
| Hierarchical Management | Managing the layers of control in a Computer System. |
| Hierarchy | The arrangement of the layers of control in a Computer System. |
| Host | Part of a Computer System (cf. Host System). |
| Host Block Address (HBA) | The LBA used by the Host to address a Storage Array Controller. |
| Host Block Size (HBS) | The block or sector size seen by the host (cf. DBS). |
| Host Command | The storage commands as transmitted by the host. |
| Host System | Part of a Computer System (also Host). |
| Host Write | A write command from a Host System. |
| Hybrid Disk | A disk drive containing different kinds of storage. |
| Indirection | A layer of management (cf. Hierarchy, Additional Mapping, Re-Mapping). |
| Inter-Disk RAID | Used to describe RAID across one or more Storage Devices. |
| Intra-Disk RAID | Used to describe RAID within a Storage Device. |
| Invalid | A region of flash memory that is no longer required (cf. Dirty) |
| Issued | A Disk Trim Command is issued to an SSD |
| List | cf. Freelist |
| Local Host | A Host System directly connected to a Storage Array. |
| Local Storage | Storage directly connected to the Host System. |
| Logical Block | The sectors or blocks of a Storage Device as seen by the Host System. |
| Logical Block | A sector as seen by the Host System. |
| Logical Block Address (LBA) | Used by a Host System to address a sector or block on a storage device. |
| Logical Unit Number (LUN) | Identifies a Storage Device or portion of a Storage Device. |
| Lost Write | See Pending Write. |
| Map | Translating one address to another in a different layer of Hierarchy. |
| Master File Table (MFT) | A data structure used by the Microsoft Windows filesystem. |
| Member | One disk in a RAID array. |
| Nested RAID | Two levels of RAID, one within the other. |
| New Flash Block | During Garbage Collection, data is moved to New Flash Blocks. |
| NT filesystem (NTFS) | Microsoft Windows file system. |
| Obsolete | Portion of a flash memory that is no longer required (cf. Invalid). |
| Old Flash Block | During Garbage Collection, the blocks that are copied are now Old Flash Blocks. |
| Operating System (OS) | Software that runs on a CPU in a Host System. |
| Operation | Part of a storage command that specifies read, write etc. |
| Over-Write | A write to a location that has already been written. |
| Parity | Check bits used to reconstruct data if a Storage Device fails in a RAID array. |
| Pending Write | A write that has not yet been performed on a Storage Device (cf. Lost Write). |
| Physical Block Number (PBN) | A physical region in flash memory where data is stored. |
| Physical Disk Address | An address corresponding to a location on a Storage Device. |
| Physical Disk Sector | See Physical Sector. |
| Physical Sector | Physical regions on a Storage Device where data is stored, typically 512 bytes. |
| RAID | Redundant Array of Independent Disks or Redundant Array of Inexpensive Disks. |
| RAID-5 | Type of RAID using Parity. |
| Random Disk Writes | Writes to random locations in a Storage Device. |
| Random Writes | Successive writes to random locations. |
| Read-Modify-Write (RMW) | A sequence of steps that occurs for small writes in a RAID array. |

TABLE 1-continued

Glossary of Terms

| Term | Description |
| --- | --- |
| Record | Data stored in the Master File Table (MFT). |
| Re-Map | Introducing an additional layer of indirection. |
| Re-Mapping | Introducing an additional layer of indirection. |
| Remote Host | A Host System remotely connected to a Storage Array (cf. Local Host). |
| Remote Storage | Storage remotely connected to the Host System (cf. Local Storage). |
| Run | See Extent. |
| Sector | A region of a Storage Device (e.g. 512 bytes). See also Block. |
| Segment | Part of a stripe in a RAID array |
| Segment Size | Amount of data written to each Storage Device in a RAID array. |
| Sequence | A Sequence of commands is a group or collection of commands. |
| Sequential Writes | Successive Writes to successive locations in a Storage Device. |
| Sequentialize | Turning Random Writes to Sequential Writes. |
| Solid-State Disk (SSD) | A Storage Device made (typically) from NAND flash memory. |
| Solid-State Storage Device | A Storage Device made from solid-state memory. See also SSD. |
| Span | A Disk Cluster spans one or more Disk Sectors. |
| Specify | A Disk Trim Command specifies Disk Sectors using Data Ranges. |
| SSD Controller | A chip that controls an SSD (cf. Storage Array Controller). |
| Staging Storage | Memory or other storage used as an intermediate store. |
| Start Sector | The area on a Storage Device where file data starts. |
| Storage Array | A collection of Storage Devices. |
| Storage Array Controller | A controller above the level of an SSD Controller. |
| Storage Command | A read, write etc. directed to a Storage Device. |
| Storage Controller | The logic on a disk, as opposed to Storage Array Controller. |
| Storage Device | Any kind of HDD, SSD, etc. |
| Stripe | A set of contiguous Data Segments that spans all Members of a Disk Group. |
| Stripe Size | The length of a stripe in a RAID array. |
| Superblock | A collection of blocks. |
| Superblock Freelist | A list containing free superblocks. |
| TRIM Command | Tells an SSD which areas may be erased. |
| Union | cf. Composite. |
| Unmapped (X) | A value in a data structure that indicates a block or sector is hidden from a Host. |
| Used (U) | A value in a data structure that indicates a block or sector contains data. |
| UserID | Identifies a user application. |
| Valid | A region of flash memory that contains useful data (cf. Invalid). |
| Virtual Cluster Number (VCN) | Used by Microsoft NTFS filesystem. |
| Virtual Machine (VM) | An abstraction or emulation of a physical CPU or Host System. |
| Volume Group | A collection of Storage Devices in a RAID array. |
| VolumeID | Identifies a logical target volume. |
| Write Hole | A vulnerability in a RAID array that can lead to data loss. |
| Writes | A Storage Command that writes data to a Storage Device. |

In the following detailed description and in the accompanying drawings, specific terminology and images are used in order to provide a thorough understanding. In some instances, the terminology and images may imply specific details that are not required to practice all embodiments. Similarly, the embodiments described and illustrated are representative and should not be construed as precise representations, as there are prospective variations on what is disclosed that will be obvious to someone with skill in the art. Thus this disclosure is not limited to the specific embodiments described and shown but embraces all prospective variations that fall within its scope. For brevity, not all steps may be detailed, where such details will be known to someone with skill in the art having benefit of this disclosure.

High-Level Description

This invention focuses on storage arrays that include flash-based storage devices or solid-state storage devices. The solid-state storage device will typically be a solid-state disk (SSD) and we will use an SSD in our examples, but the solid-state storage device does not have to be an SSD. An SSD may for example, comprise flash devices, but could also comprise other forms of solid-state memory components or devices (e.g. SRAM, DRAM, MRAM, etc.) and the storage may be volatile, non-volatile, etc., a combination of different types of solid-state memory components, or a combination of solid-state memory with other types of storage devices (often called a hybrid disk). Such storage arrays may additionally include hard-disk drives (HD or HDD). We use the term storage device to refer to any kind of HDD, SSD, hybrid disk, etc.

A storage array controller is logically located between a host system (or host) and multiple storage devices (e.g. multiple SSDs, multiple HDDs, or a mix of SSDs and HDDs, or a mix of various storage devices, etc.). An SSD typically contains its own SSD controller (which may be implemented as an SSD Controller Chip), but a storage array controller may have more resources than an SSD controller. This invention allows a storage array controller to use resources, such as larger memory size, non-volatile memory, etc. as well as unique information (because a storage array controller is higher than the SSD controller(s) in the storage array hierarchy, i.e. further from the storage devices) in order to manage and control a storage array as well as provide information to the SSD controller(s). A storage array controller also has additional unique information since it typically connects to multiple SSDs.

A Storage Array Controller

Figure 2:
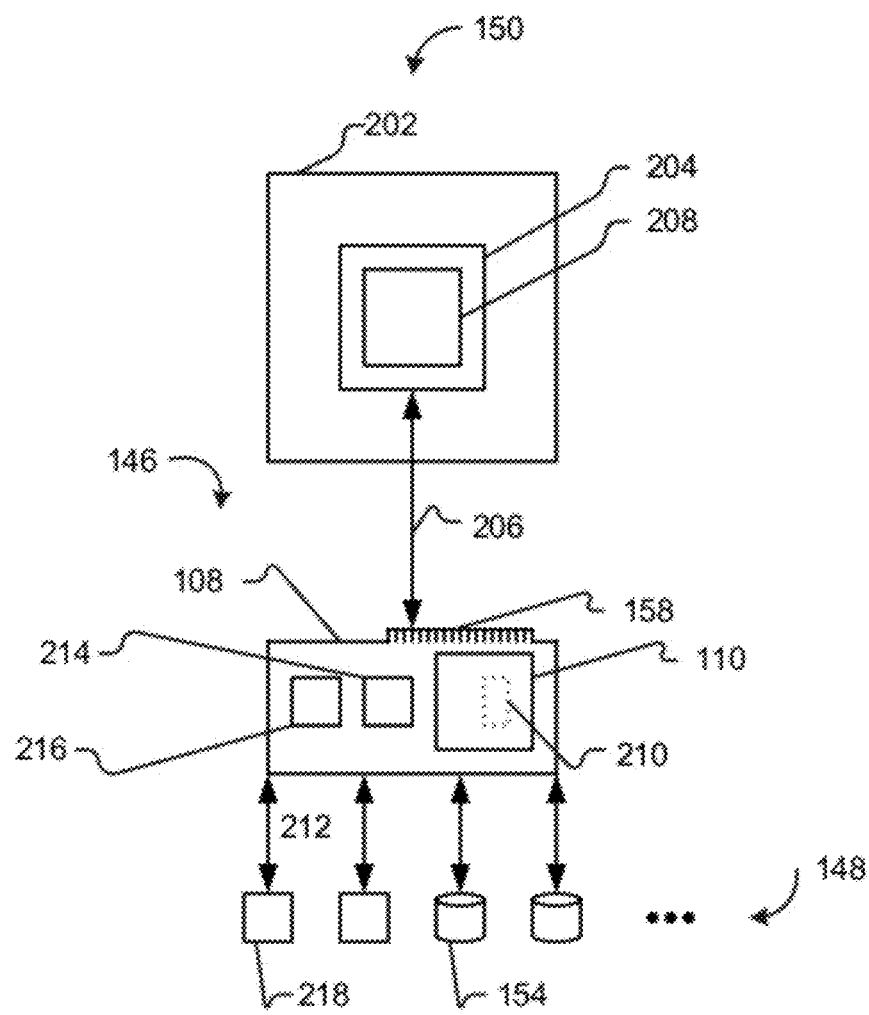
FIG. 2 (block diagram) shows a computer system, with host system and CPU, together with a storage array controller and storage array comprising two solid-state disk drives and two hard-disk drives.

FIG. 1 shows an embodiment of a Storage Array Controller 108 (pictorial, not to scale). In FIG. 1, a Computer System 150 comprises ("comprising" or "comprises" as used throughout this description means "includes the following, but not limited to the following"): (a) the Storage Array Controller 108; (b) a Storage Array 148. In FIG. 1, the Storage Array 148 comprises: (a) any combination of Hard Disk Drive 154 (zero, one or more; two shown in FIG. 1) and (b) Solid-State Disk 218 (zero, one or more; none shown in FIG. 1). In FIG. 1, the Storage Array Controller 108 comprises: (a) at least one Storage Array Controller Chip 110; (b) at least one Storage Bus Connector 156 that is operable to couple or connect the Storage Array Controller 108 to the Storage Array 148; (c) typically one (but could be more than one for redundancy, reliability, performance, etc.) IO Bus Connector 158 that is operable to couple or connect the Storage Array Controller 108 to the Computer System 150.

In the embodiment of FIG. 2 (block diagram), Computer System 150 comprises: (a) Host System 202; (b) CPU 204; (c) IO Bus 206; (d) Operating System 208; (e) Storage Array Controller 108; (f) Storage Subsystem 146; (f) Storage Array 148. In FIG. 2, the Storage Array Controller 108 comprises: (a) Storage Array Controller Chip 110, (b) Storage Array Controller Flash Chip 214 (one or more, optional), (c) Storage Array Controller DRAM Chip 216 (one or more, optional). In FIG. 2, the Storage Array Controller Chip 110 comprises: Storage Array Controller Logic 210. In FIG. 2, Storage Array Controller 108 is coupled or connects (via at least one Storage Bus 212) to the Storage Array 148 that comprises any combination of Hard Disk Drive 154 (zero, one or more) and Solid-State Disk 218 (zero, one or more). In FIG. 2, Storage Array Controller 108 is operable to be coupled or connected (via at least one IO Bus 206) to CPU 204.

In alternative systems and/or for different uses of Computer System 150, the Operating System 208 may be a real-time OS (RTOS, etc,); an embedded OS for PDAs (e.g. iOS, Palm OS, Symbian OS, Microsoft Windows CE, Embedded Linux, NetBSD, etc.); an embedded OS for smartphones, cell phones, featurephones, etc. (e.g. BlackBerry OS, Embedded Linux, Android, MeeGo, iPhone OS, Palm OS, Symbian OS, etc.); a desktop or platform OS (e.g. Microsoft Windows, Linux, Mac OS, Google Chrome OS, etc.); a proprietary OS, platform, or framework for storage applications (e.g. LSI FastPath, Fusion-MPT, etc.); or other operating system, operating environment (cloud-based etc.), virtual operating system or virtual machine (VM, etc.). In some such systems, e.g. for systems that use proprietary frameworks or for specialized storage appliances or storage systems, Operating System 208 or a part of it, or similar functions to Operating System 208, may be integrated with Storage Array Controller 108, or parts of Storage Array Controller 108.

Figure 3:
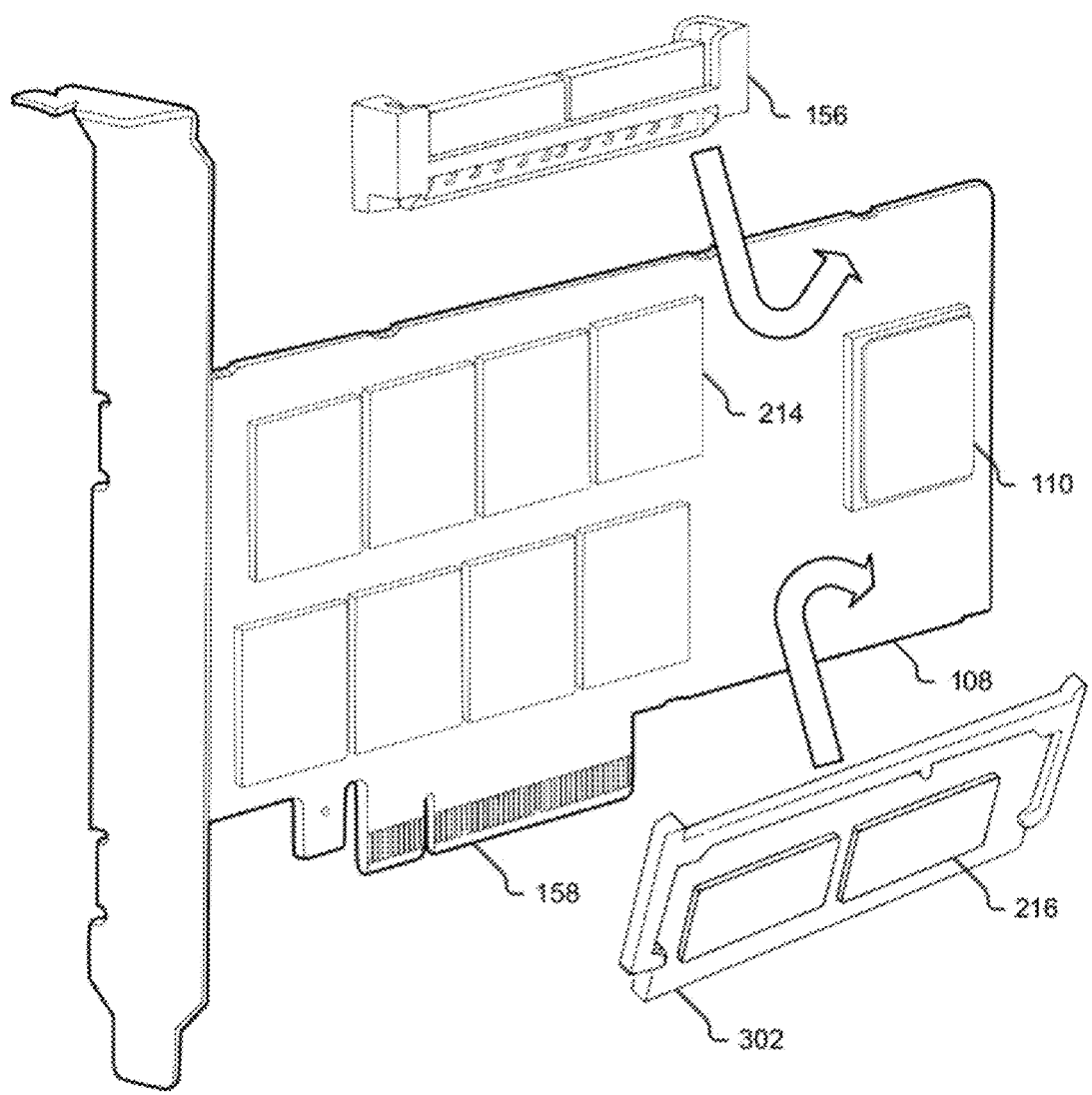
FIG. 3 (pictorial) shows a storage array controller PCIe card with flash memory, DRAM memory, and a storage bus connector.

In the embodiment of FIG. 3 (pictorial), Storage Array Controller 108 comprises: (a) Storage Bus Connector 156 (zero, one or more; a connector suitable for SAS, SATA, or similar bus is shown, but the connection may be SCSI or Ethernet (including iSCSI, FCoE, etc.) or any other bus, network, or point-to-point connection, etc.); (b) Storage Array Controller Chip 110 (one or more; may be integrated with other functions on the Storage Array Controller 108); (c) Storage Array Controller Flash Chip 214 (optional; may be one or more chips; each chip may be NAND flash or other type of solid-state storage; may be in addition or instead of any other SSD, other solid-stage storage device, or other storage device, etc; may be integrated with Storage Array Controller Chip 110; etc.); (d) Storage Array Controller DRAM Chip 216 (optional; one or more chips; may be SDRAM or other type of random-access memory; may be mounted on one or more Storage Array Controller DIMM 302 as shown; or may be mounted directly on Storage Array Controller 108; or may be integrated with Storage Array Controller Chip 110; etc.), (e) IO Bus Connector 158 (typically one, but may be more; a connector for PCI-E is shown, but the connection may be any bus, point-to-point, multidrop, serial, or other connection).

Figure 4:
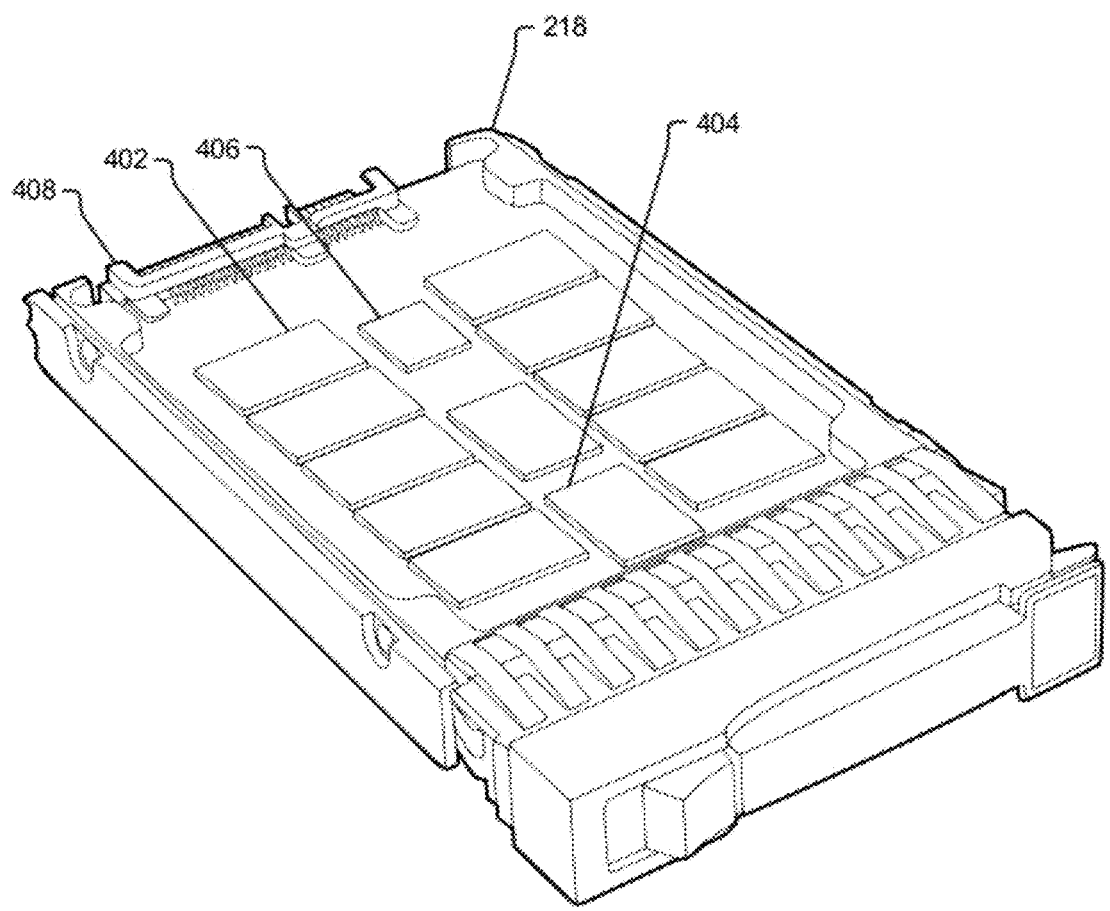
FIG. 4 (pictorial) shows a solid-state disk with flash memory and a solid-state disk controller chip.

In the embodiment of FIG. 4 (pictorial), Solid-State Disk 218 comprises: (a) Solid-State Disk Flash Chip 402 (may be one or more chips; each chip may contain multiple stacked die; each chip may be NAND flash of any type (e.g. MLC, SLC, etc.); may be other forms of flash memory (e.g. NOR, OneNAND, etc.); may be EEPROM, phase-change memory (PCM, etc.), or any other type of non-volatile (or volatile) memory, etc.; and may be integrated with other components); (b) Solid-State Disk DRAM Chip 404 (optional; may be one or more chips; each chip may contain multiple stacked die; may be integrated with other components; may be SDRAM (DDR, DDR2, DDR3, etc.) or any other form of random access memory (e.g. MRAM, PRAM, SRAM, FeRAM, etc.) or other memory (e.g. SRAM, volatile, non-volatile, random access type, non-random access type, etc.); (c) Solid-State Disk Controller Chip 406 (may be integrated with other components i.e. integrated with Solid-State Disk DRAM Chip 404 and/or Solid-State Disk Flash Chip 402, or Storage Array Controller 108); may be an application-specific integrated circuit (ASIC), CPU, field-programmable gate array (FPGA), system on chip (SOC), or other form of silicon chip, integrated component, integrated package or system, etc.); (d) Solid-State Disk Connector 408 (optional; may be one or more).

Without departing from the scope of the invention other embodiments than are shown in FIG. 1 and FIG. 2 are possible for Computer System 150 and Storage Array 148. For example, other embodiments may include, but are not limited to, the following: (a) embodiments as shown in other figures in this description (including other topologies, configurations, and structures); (b) embodiments that are described in application Ser. No. 12/876,393; including for example, the following paragraphs [0036], [0038] and [0041]; (c) embodiments described in other paragraphs and figures in application Ser. No. 12/876,393; (d) variations of the embodiments described here with the same basic function(s) of Computer System 150 and Storage Array 148 to store and retrieve information.

Without departing from the scope of the invention other embodiments for Storage Array Controller 108 and Solid-State Disk 218 than are shown in FIG. 3 and FIG. 4 are possible. For example, other embodiments for Storage Array Controller 108 and Solid-State Disk 218 may include, but are not limited to, the following: (a) the Storage Array Controller 108 may be mounted on a printed-circuit board (PCB) e.g. a PCI Express (PCI-E or PCIe) card as shown in FIG. 3, or integrated with other system components (CPU, chipset, memory devices, disk drive, SSD, etc.), or may use any other form factor or packaging; (b) the Solid-State Disk 218 may be a standard form-factor disk (such as the standard EIA 2.5-inch or 3.5-inch form factor shown in FIG. 4); may be a PCIe card (possibly together with Storage Array Controller 108); may be some other type of PCB; and may use either a non-standard or standard form factor; or may be combined, integrated, or packaged into one or more components, integrated circuits, or packages. With increased levels of integration a Storage Array Controller 108 and one or more Solid-State Disk 218 may be combined, integrated or packaged together into one or more components, integrated circuits, or packages. In other embodiments, the Storage Array Controller 108 may control (and/or be integrated, combined, or packaged with) one or more managed Solid-State Disk Flash Chip 402 or intelligent Solid-State Disk Flash Chip 402, where each intelligent Solid-State Disk Flash Chip 402 or managed Solid-State Disk Flash Chip 402 appears to have one or more functions equivalent to one or more Solid-State Disk 218.

Storage Array Controller Functions

Figure 5:
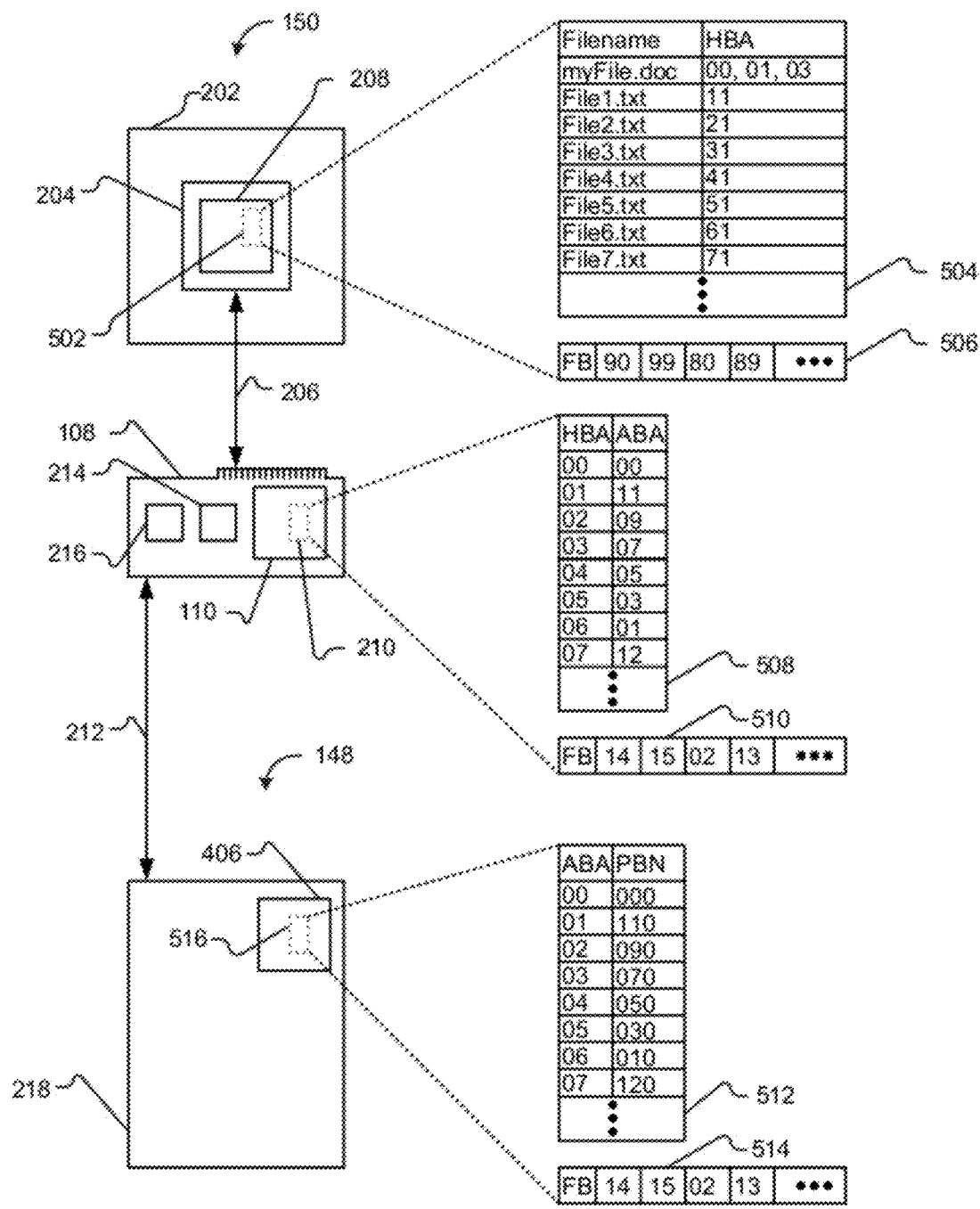
FIG. 5 (block diagram) shows a computer system with storage array controller and illustrates the use of a storage array controller map.

In the embodiment of FIG. 5 (block diagram), Computer System 150 comprises: (a) Host System 202; (b) Storage Array Controller 108; (c) Solid-State Disk 218 (only a single SSD is shown in this example for simplicity).

In FIG. 5, Host Filesystem Logic 502 comprises: (a) Host Filesystem Map 504; (b) Host Filesystem Freelist 506.

In FIG. 5, the Solid-State Disk 218 comprises: (a) Solid-State Disk Controller Chip 406 (b) Solid-State Disk Logic 516.

In FIG. 5, Storage Array Controller Logic 210 comprises: (a) Storage Array Controller Map 508; (b) Storage Array Controller Freelist 510.

In FIG. 5, Solid-State Disk Logic 516 comprises: (a) Solid-State Disk Map 512; (b) Solid-State Disk Freelist 514.

In FIG. 5, Host Filesystem Map 504 contains a list or map of filenames and HBAs. The sectors or blocks of a storage device are addressed as logical blocks using a logical block address (LBA). To avoid confusion, we will use host block address (HBA) for the LBA used to address a storage array controller. The Host Filesystem Map 504 links or maps each filename to corresponding HBAs. In the 2010 timeframe a sector is typically 512-bytes, but with increasing use of 4-kbyte sectors. (We will use the term sector rather than block, used by itself, to avoid confusion with the common use of block in solid-state memory to mean something different.)

In different and/or alternative systems and/or for different uses of Computer System 150 the Host System 202 may use a different scheme than Host Filesystem Logic 502, Host Filesystem Map 504, Host Filesystem Freelist 506, and their related structures, components, and logic. For example, implementations and embodiments described here are not limited to systems that use a Host Filesystem Map 504. For example, embedded systems, object-oriented filesystems, or other systems may have no notion of files and filenames. These systems will still generate what we call an HBA, or the equivalent of an HBA, or what would be called an LBA in the absence of a storage array controller.

Unless we explicitly state otherwise, we assume that the host block size (HBS) is equal to the disk block size (DBS). In some embodiments, the HBA may be a composite or union of a logical unit number (LUN) that identifies a logical portion of the storage array or disk or other device in the storage array; an LBA; the virtual machine (VM), if any; a UserID that identifies the user application; a VolumeID that identifies a logical volume; and other data that may be used for logical access or management purposes. Note that to simplify the description and clarify the figures, the LUN and other details may be omitted, or shown separately from HBA in some figures. It should still be clear that operations may be performed on different LUNs.

In FIG. 5, Host Filesystem Freelist 506 comprises free blocks (FB), a list or freelist of HBAs that are free for use.

In FIG. 5, Storage Array Controller Map 508 maps HBAs to ABAs. A disk number (D) identifies a disk or other storage device in the storage array. A disk logical block address (DBA) is the LBA that identifies the disk sector on the disk or other storage device. An array block address (ABA) is a composite or union of D and DBA, written <D, DBA>. Note that the storage array may be a RAID array, JBOD, or any other particular type of storage array. A status field (S) (not shown) holds the status of the disk sector corresponding to the HBA. Field S may use codes comprising: used (U); unmapped (X); garbage (G), i.e. ready for garbage collection. Field S may use other codes, or other functions for the codes.

In FIG. 5, Storage Array Controller Freelist 510 comprises a list of ABAs that are free for use.

In FIG. 5, Solid-State Disk Map 512 maps ABAs to PBNs. A disk controller for an HDD maintains the relationship between an ABA (or the DBA portion of the ABA) and the disk sectors that are physically part of a storage device (often called the physical disk sectors or physical sectors). In exactly the same way the Solid-State Disk Map 512 maintains the relationship between an ABA and the physical block number (PBN) of an SSD. The PBN of an SSD is analogous to the physical disk sector of an HDD. Due to resource constraints SSDs often manage the PBNs at a coarser granularity than disk sectors.

In FIG. 5, Solid-State Disk Freelist 514 comprises a list of PBNs that are free for use.

Because the terms just described can be confusing we summarize the above again briefly. With just a single disk, the host provides an LBA directly to the disk; the disk controller converts the LBA to the physical disk sector (for an HDD) or to the PBN (for an SSD). In the presence of a storage array controller the host still provides an LBA, but now to the storage array controller instead of a disk (and thus we call the LBA an HBA to avoid confusion). The storage array controller then maps this HBA to an ABA and provides the ABA to the disk. The disk (HDD or SSD) then converts this ABA to a physical disk address: either the physical disk sector (for an HDD) or PBN (for an SSD).

It is important to understand the additional layer of hierarchy that a storage array controller introduces. This additional layer of hierarchy (i.e. additional level of indirection, or additional mapping, re-mapping, etc.) permits the improvements described here. The storage hierarchy of FIG. 2 has the following layers: (i) Operating System 208; (ii) Storage Array Controller 108; (iii) Storage Array 148. In FIG. 2, the Storage Array Controller 108 has a higher position in the hierarchy than Solid-State Disk 218, i.e. is further from the storage devices. In FIG. 2, it is the Storage Array Controller 108 that adds a level of indirection (i.e. adds a map or re-map of data, or re-maps data, etc.) between Host System 202 and Storage Array 148. In FIG. 2 the Storage Array Controller 108 may also add additional resources over and above that of Solid-State Disk 218 due to the additional layer of hierarchy.

Alternative Implementations

Data structures, fields, commands, etc. and the algorithms, functions, and operations, etc. used in embodiments here are defined in terms of software operations, code and pseudo-code, but it should be noted that the algorithms etc. may be performed in hardware; software; firmware; microcode; a combination of hardware, software, firmware or microcode; or in any other manner that performs the same function and/or has the same effect. The data structures etc. (or parts of them) may be stored in the storage array controller in SRAM, DRAM, embedded flash, or other memory. The data structures (or parts of them) may also be stored outside the storage array controller, for example on any of the storage devices of a storage array (the local storage or remote storage, i.e. remote from the storage array connected to the storage array controller) or on a host system (the local host or a remote host, i.e. remote from the host connected to the storage array controller). For example, FIG. 2 shows the Storage Array Controller 108 comprising: (a) Storage Array Controller Chip 110; (b) Storage Array Controller Logic 210. Alternative implementations are possible: (i) the Storage Array Controller Logic 210 may be completely in hardware, completely in software, or partly hardware and partly software, and may be in any location, on the host or remote, for example; (ii) the Storage Array Controller Logic 210 may not physically be in the Storage Array Controller Chip 110 or in the Storage Array Controller 108; (iii) the Storage Array Controller Chip 110 may be implemented as a chip, an ASIC, an FPGA or equivalent, a combination of such components, or may be a combination of hardware and software; (iv) the Storage Array Controller Chip 110 may be a portion (or portions) of a larger chipset, IO controller, processor, etc.; (v) the Storage Array Controller Chip 110 may be part of, or be integrated with, the Storage Array 148, or one or more parts of the Storage Array 148; (vi) Storage Array Controller 108 or components therein (e.g. Storage Array Controller Chip 110, Storage Array Controller Logic 210, etc.) may contain its own OS (e.g. embedded Linux, Windows CE, Google Android, or combination of OS and other software, etc.); (vii) any of these in combination. The logical placement of the storage array controller functions and algorithms between operating system and a storage array enables the functions described here.

Details Common to Several Embodiments

We will now define some of the data structures used in one or more of the embodiments described here (including a map and a freelist). A map hr_map is defined between HBAs and ABAs, for example, as hr_map[hba]->aba. Thus hr_map takes an HBA as input and returns an ABA. We say that the HBA maps to that ABA (we can also say that the storage array controller maps or re-maps data from the operating system). A special symbol or bit may indicate that an entry in hr_map[hba] is unmapped, and/or we can use a special table entry to indicate an entry in hr_map[hba] is unmapped. A freelist uses a structure aba_free to maintain a list of free blocks that may be used.

Distinction Between Storage Array Controller and Disk Controller Etc.

We have used the term storage array controller throughout this description (rather than, for example, storage controller) in order to avoid confusion with disk controller or SSD controller. In FIG. 2 for example, the Storage Array Controller 108 is logically separate from any disk controllers or SSD controllers that are part of the storage devices that form the Storage Array 148. As shown for example in FIG. 5, the Storage Array Controller 108, the Storage Array Controller Chip 110, Storage Array Controller Logic 210 are all logically separate from the Solid-State Disk Controller Chip 406 and Solid-State Disk Logic 516 typically used by the Solid-State Disk 218.

Disk Trim Command and Equivalents

The algorithms, operations, etc. in various embodiments described here may use a disk trim command (trim command or just trim). A disk trim command was proposed to the disk-drive industry in the 2007 timeframe and introduced in the 2009 timeframe. One such disk trim command is a standard storage command, part of the ATA interface standard, and is intended for use with an SSD. A disk trim command is issued to the SSD; the disk trim command specifies a number of disk sectors on the SSD using data ranges and LBAs (or using ABAs or the DBAs contained in ABAs in the presence of a storage array controller); and the disk trim command is directed to the specified disk sectors. The disk trim command allows an OS to tell an SSD that the disk sectors specified in the trim command are no longer required and may be deleted or erased. The disk trim command allows the SSD to increase performance by executing housekeeping functions, such as erasing flash blocks, that the SSD could not otherwise execute without the information in the disk trim command.

It should be noted from the above explanation that when we say, for example, "place an ABA in a disk trim command," the disk trim command may actually require an LBA (if it is a standard ATA command for example), and that LBA is the DBA portion of the ABA. To simplify the description we may thus refer to an LBA, DBA and ABA as referring to the same block address, and thus mean the same thing, at the disk level.

In certain embodiments, the disk trim command and other storage commands have fixed and well-specified formats defined by various standards (e.g. SATA, SCSI, etc.). These standard commands are often complicated with many long fields, complicated appearance, and complex use. Storage commands typically also vary in format depending on the type of storage bus (e.g. SCSI, ATA, etc.). In this description in order that the invention may be made clear, we may simplify disk trim commands, storage commands and other commands in the text and figures in order to simplify the description and explanation (and the format of the storage commands may also vary between different figures and different embodiments). The embodiments described here are intended to work with any standard command set (and/or any non-standard and/or proprietary command set) even though a command or command set shown in the text or in a figure in this description may not exactly follow any standard formats, for example.

In certain embodiments, the Storage Array Controller 108 may read from a storage device to determine if a disk trim command (or equivalent command, operation, etc.) is supported. For example by inspecting the IDENTIFY DEVICE data word using the ATA command set.

In certain embodiments, the result of a read from a storage device after a trim command is performed may be configured: e.g. (a) deterministic read data (e.g. always zero) (b) determinate read data but set to any value (c) indeterminate read data (indeterminate means two successive reads may return different values).

In certain embodiments, the disk trim command may take the form of a command with a field or bit set to a certain value: e.g. an ATA trim command is DATA SET MANAGEMENT command with trim bit set. Other command sets and standards may use similar techniques.

In certain embodiments, the disk trim command may take the form of a command (or command structure, data structure, subroutine call, function call, etc.) issued at a higher level (e.g. within the OS, within a device driver, etc.) that may then be converted to a lower-level disk command. For example, in the Linux OS, a discard at the block device level may be translated to a disk trim command (or equivalent command) directed at a storage device. The translation or conversion of one form of disk trim command (or equivalent command) to another form of disk trim command (or equivalent command) at the same or at a different layer of storage hierarchy may take place in software (e.g. host system OS, storage management systems, firmware, device drivers, frameworks such as LSI Fusion-MPT, etc.) or may be performed by Storage Array Controller 108 (in software, hardware, firmware, or in a combination of these). Of course during the translation or conversion, in various alternative embodiments, it may be necessary and/or advantageous to convert or translate one or more disk trim commands (or equivalent commands) as follows: (a) one or more commands to a single command; (b) one command to one or more commands; (c) convert between command types (e.g. between standards, to/from non-standard, to/from proprietary, different forms, different formats, etc.); (d) translate one or more bits or fields in command(s); (e) merge one or more commands; (f) accumulate commands; (g) aggregate commands; (h) alter, delete, insert or modify commands; (i) alter the timing of commands (e.g. with respect to other disk trim commands, with respect to other storage commands, etc.); (j) modify the form (e.g. insert, change, delete, re-order, accumulate, aggregate, combine, etc.) and function (e.g., purpose, content, format, timing, relative timing, dependence, etc.) of one or more related storage commands; (k) one or more of any of these in combination.

A disk trim command may also take the form of a different storage command that is used or re-used (e.g. re-purposed, re-targeted, etc.) as a disk trim command. For example, many OS (or storage management systems, firmware, device drivers, frameworks such as LSI Fusion-MPT, etc.) allow regions of storage to be managed (e.g. maintaining disk quotas, thin provisioning, etc.). For example, in order to provide thin provisioning in a storage array, physical storage is allocated to virtual LUNs on demand and is deallocated (or freed, we will not use the term deallocate or deallocation to avoid confusion with its use in the context of memory) when no longer required. Typically physical storage is allocated in large chunks (typically hundreds of kBytes). If the storage array uses SCSI storage devices or a SCSI bus or framework, then a T10 SCSI UNMAP command may allow one or more of the allocated chunks to be freed. A discard command (or other equivalent command) from the OS may be converted to an UNMAP command (or other equivalent command) and effectively used as a disk trim command. Thus, storage management may often require functions similar to disk trim to be performed (discarding unwanted data, freeing flash blocks, deallocating or freeing storage space, etc.). Thus, in certain embodiments, one or more standard commands (e.g. T10 SCSI WRITE SAME command, T10 SCSI UNMAP command, etc.) may be used to perform a function similar or identical to one or more disk trim commands as described here.

In certain embodiments, the disk trim command may be proprietary (e.g. non-standard, unique to a particular vendor, etc.) to one or more storage devices in a storage array. For example, some SSDs may have a unique command to free data. Thus, in certain other embodiments, one or more non-standard commands may be used to perform a function similar or identical to the disk trim commands used in the described examples.

Thus, in certain embodiments, one or more standard commands (e.g. T10 SCSI WRITE SAME command, T10 SCSI UNMAP command, Linux discard, ATA trim command, etc.) or other similar non-standard commands (proprietary commands, private functions and calls, hidden fields and bits, etc.) may be used to perform a function similar or identical to one or more disk trim commands of different form, format, type, or function (e.g. ATA trim command, Linux discard, etc.).

Storage Arrays

A storage array controller performs certain functions instead of (or in addition to) an OS running on a host system; and a storage array controller also performs certain functions instead of (or in addition to) an SSD controller(s) in a storage array. A storage array controller is logically located between a host system and an SSD. An SSD contains its own SSD controller, but a storage array controller may have more resources than an SSD controller. The algorithms described here allow a storage array controller to use resources, such as larger memory size, non-volatile memory, etc. as well as unique information (because a storage array controller is higher than an SSD controller in a storage array hierarchy, i.e. further from the storage devices) in order to manage and control a storage array as well as provide information to an SSD controller. For example, a storage array controller is aware of LUNs but a SSD controller is not. This hierarchical management approach has other advantages and potential uses that are explained throughout this description in the forms of various algorithms that may be employed by themselves or in combination.

Note that the various storage-array configuration alternatives as well as other various possibilities for the storage array configuration(s), storage bus(es), and various storage device(s) will not necessarily be shown in all of the figures in order to simplify the description.

Garbage Collection

In the context of solid-state storage, typically flash memory, when a flash page (or some other portion, block, section, subset, etc.) of a storage device is no longer required (i.e. it is obsolete, no longer valid, is invalid, etc.) that flash page is marked as dirty. When an entire flash block (typically, in the 2010 timeframe, between 16 and 256 flash pages) is dirty, the entire flash block is erased and free space reclaimed. If free space on the device is low, a flash block is chosen that has some dirty flash pages and some clean (i.e. pages that are not dirty, are good, valid, etc.) flash pages. The clean flash pages are transferred (i.e. written, moved, copied, etc.) to a new flash block. All the original clean flash pages are marked as dirty and the old flash block is erased. In the context of solid-state storage, this process of transferring flash pages to new flash blocks and erasing old flash blocks is called garbage collection. The exact technique used for garbage collection, well-known to someone skilled in the art, is not a key part of the algorithms, embodiments and examples that are described here. One basic idea is that garbage collection, in certain embodiments, may be performed by the storage array controller.

Sequentializing Writes

Figure 6:
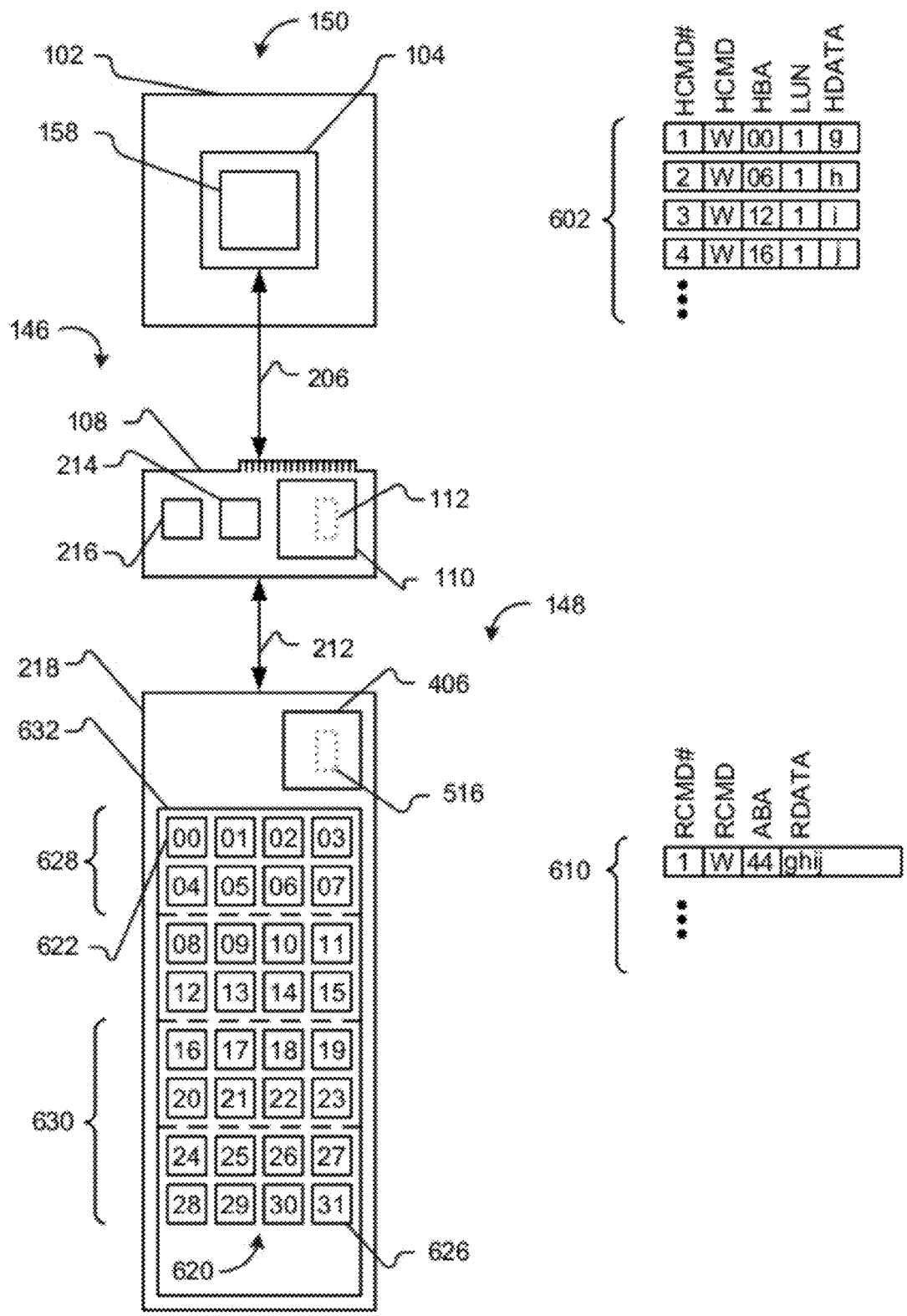
FIG. 6 (block diagram) shows a computer system with storage array controller and illustrates the use of a storage array controller to sequentialize writes.

In the embodiment of FIG. 6 (block diagram), Storage Array Controller 108 sequentializes storage commands.

A storage command is more commonly called a disk command or just command, a term we will avoid using in isolation to avoid confusion. To avoid such confusion we will use storage command when we are talking about commands in general; but we will save disk command (or disk write, etc.)

for the command as it arrives at (or is received by) the disk (either SSD or HDD, usually via a standard interface or storage bus, e.g. SATA, SCSI, etc.); we will use the term host command (or host write, etc.) for the command as it leaves (or is transmitted by) the OS. A disk command may be the same as a host command, for example, when there is a direct connection between the OS on a host system and a single disk (or other storage device). In the presence of Storage Array Controller 108, the host commands are translated (e.g. converted, re-formatted, etc.) to disk commands by Storage Array Controller 108. We also say the Storage Array Controller 108 creates a sequence (e.g. string, chain, collection, group, one or more, etc.) of disk commands (e.g. for reads, writes, control commands, query commands, status commands, etc.) by using the sequence of host commands (e.g. extracts, translates fields and formats in commands, inserts write data, etc.). (Note that a sequence of commands does not imply sequential writes.) The Storage Array Controller 108 also creates (e.g. translates, converts, etc.) responses (or read responses, query responses, status responses, error responses, etc.) from a storage device to the host system (e.g. creates fields and formats in packets, inserts read data, inserts information, inserts status, inserts error codes, etc.).

In FIG. 6, the Host Write Commands 602 comprise: HCMD#, the host command number; HCMD, the host command (in this example all host commands are W or writes); HBA (the host LBA); LUN; HDATA (the data in the host command). A storage command is directed to a storage device and specifies an operation, such as read, write, etc. Note that we have stylized the write data as characters (using g, h, i, j, etc. in FIG. 6 and elsewhere) to simplify the description. Note that the storage (host and disk) commands used in FIG. 6 and in other figures are stylized and simplified versions of what a particular command, in this case a write command, may look like. The simplified commands used in FIG. 6 and elsewhere may contain the same information content that an industry-standard write command contains (e.g. in a commercial embodiment following an industry standard); but not necessarily in the exact format used, for example, by the ATA industry standard. Note also that there are other disk commands and other host commands than write commands; and that other forms of all such commands are also possible.

In FIG. 6, the Disk Commands 610 comprise: RCMD#, the disk command number; RCMD, the disk command (in this example all disk commands are writes); ABA; RDATA (the data in the disk command). (As a reminder: normally a disk command comprises an LBA provided by the host, but in the presence of a storage array controller the disk command comprises an ABA provided by the storage array controller.)

In FIG. 6, Flash Memory 632 comprises: 2 Flash Block 630 or 4 Flash Page 628 or 32 Sectors 620 (numbered from Sector 00 622 to Sector 31 626). We have greatly reduced the memory size in this example to simplify the description without limiting the scope of the description. For example, the Micron 32-Gbit NAND flash memory (part number MT29H32G08GCAH2), a commercially available part in the 2010 timeframe, contains 8 k 512-kbytes flash blocks, and 128 4-kbyte flash pages per block.

Figure 7:
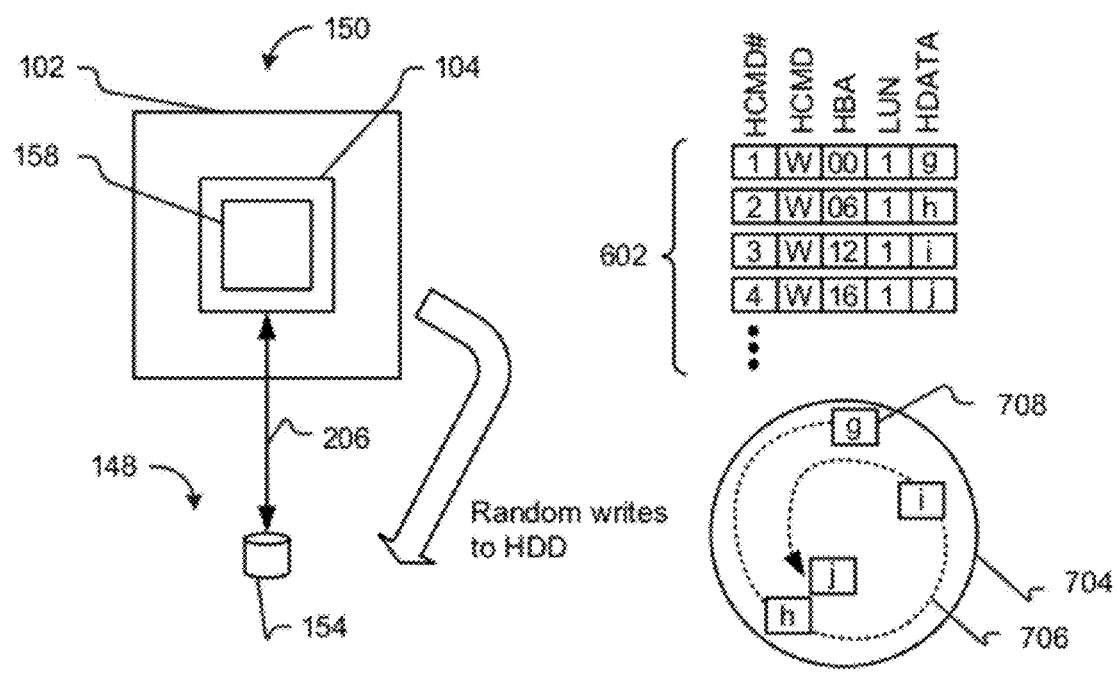
FIG. 7 (block diagram) shows host write commands being sent to a hard-disk drive.

In FIG. 7 (block diagram), the Host Write Commands 602 are sent directly to Hard Disk Drive 154 and the Hard Disk Drive Write Sequence 706 over Hard Disk Drive Platter 704 is to random locations at each Hard Disk Drive Sector Location 708 corresponding to random disk writes.

Figure 8:
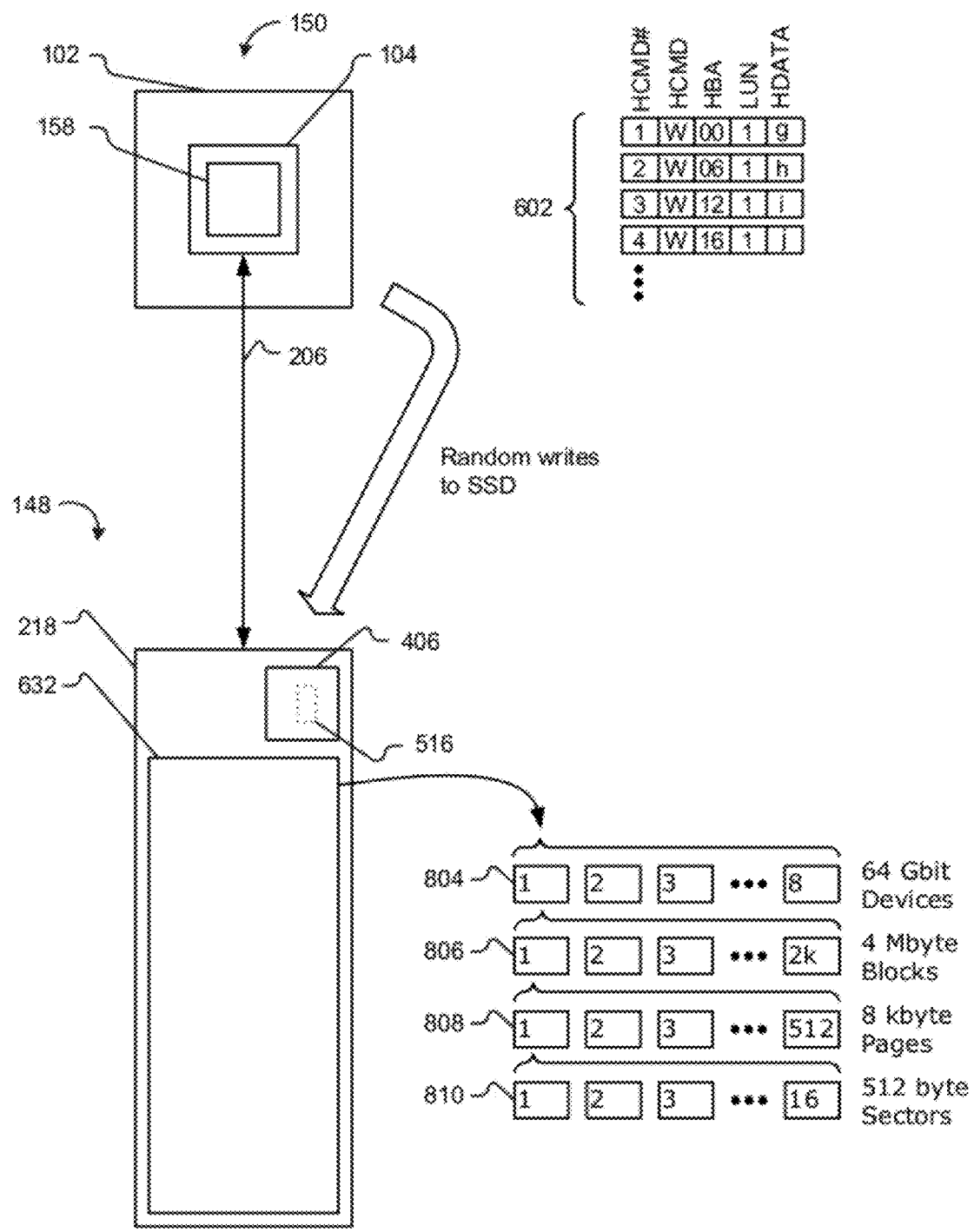
FIG. 8 (block diagram) shows a solid-state drive connected directly to a computer system.

FIG. 8 (block diagram) shows the structure of a 64-Gbyte SSD. The main elements of FIG. 8 are similar to previous Figures. In FIG. 8, Solid-State Disk 218 contains a Solid-State Disk Controller Chip 406 and Flash Memory 632. In FIG. 8, Flash Memory 632 consists of eight 64-Gbit Flash Devices 804. In FIG. 8, the 64-Gbit Flash Devices 804 each consist of 2 k (2048) 4-Mbyte Flash Blocks 806. In FIG. 8, the 4-Mbyte Flash Blocks 806 each consist of 512 8-kbyte Flash Pages 808. In FIG. 8, the 8-kbyte Flash Pages 808 each consist of 16 512-byte Disk Sectors 810. In FIG. 8, the Solid-State Disk 218 thus contains 16×2 k 32 k (32768) flash blocks; 8×2 k×512 or 8M (8388608) flash pages; and 16×2 k×256×16 or 128M (134217728) disk sectors. These are practical an realistic numbers for a NAND flash device and an SSD in the 2010 timeframe.

In FIG. 8, the Host Write Commands 602 are sent directly to Solid-State Disk 218. Each of Host Write Commands 602 is separate and typically will result in Solid-State Disk Controller Chip 406 writing to a random sequence of flash pages in random blocks (possibly also triggering garbage collection); this corresponds to random disk writes.

Figure 9:
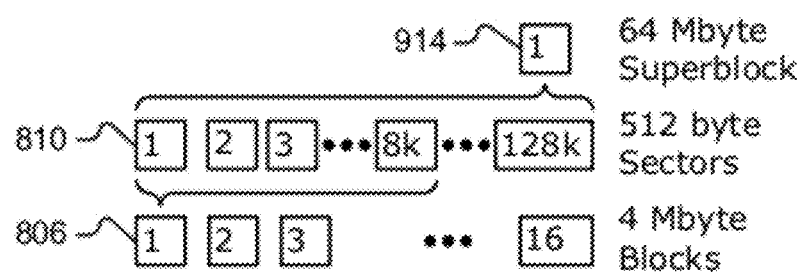
FIG. 9 shows a superblock, as used by a storage array controller.

In FIG. 9 Superblock 914 comprises 128 k 512-byte Disk Sectors 810 or 16 4-Mbyte Flash Blocks 806; and the 4-Mbyte Flash Blocks 806 each contain 8 k 512-byte Disk Sectors 810.

Figure 10:
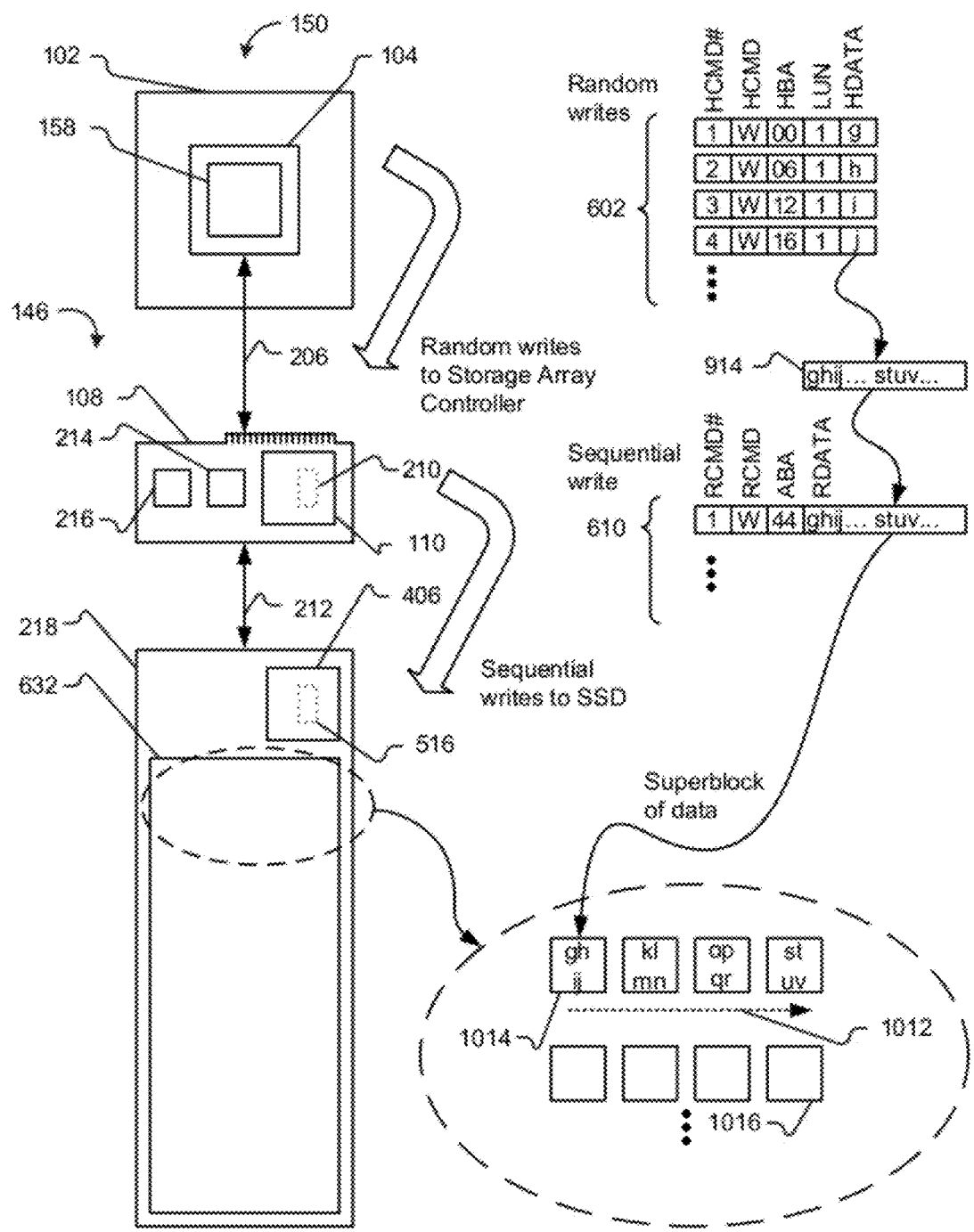
FIG. 10 (block diagram) illustrates how a storage array controller sequentializes writes.

In FIG. 10 (block diagram), Storage Array Controller 108 comprises Storage Array Controller Chip 110. In FIG. 10, Storage Array Controller Chip 110 comprises Storage Array Controller Logic 210. In FIG. 10, Storage Array Controller Logic 210 buffers HDATA to create a Superblock 914 of data; re-maps the HBAs to field ABA in Disk Commands 610; and inserts a Superblock 914 of data into field RDATA in Disk Commands 610. In FIG. 10, a Superblock 914 contains 16 4-Mbyte Flash Blocks 806, and thus hundreds or thousands of random writes corresponding to Host Write Commands 602 are converted to a single write command in Disk Commands 610. In FIG. 10, a single write command in Disk Commands 610 will then be converted by Solid-State Disk Controller Chip 406 to 16 block writes; one block write to each of 16 flash blocks. In FIG. 10, the Flash Write Sequence 1012 from Start of Superblock 1014 to End of Superblock 1016 corresponds to sequential disk writes (or sequential writes). In FIG. 10, Storage Array Controller 108 thus converts up to 128 k 512-byte sector random host writes (if each host write is to a single 512-byte sector) to 16 sequential disk writes. We say Storage Array Controller 108 sequentializes writes, or that writes are sequentialized by Storage Array Controller 108.

Other Embodiments of Filesystems, Maps etc.

In the embodiment shown for example in FIG. 5, for clarity of description we have simplified the functions and behavior of Host Filesystem Logic 502, Host Filesystem Map 504, Host Filesystem Freelist 506, and their related structures, components, and logic compared to the functions and behavior that one would see, for example, in a modern desktop operating system, such as Microsoft Windows, Linux, etc. In practical, commercial systems, and/or alternative systems and/or for different uses of Computer System 150, the functions and behavior of Host Filesystem Logic 502, Host Filesystem Map 504, Host Filesystem Freelist 506, and their related structures, components, and logic may be more complex. For example, if one were to look at bus traces showing commands, one might see more complex behavior than described here. For the purposes of illustration, we shall pick one example operating system, Microsoft Windows (those versions based on Windows NT technology including, for example: Windows 2000, Windows XP, Windows Vista, Windows 7, etc.). For purposes of illustration, we shall describe some of these complexities, as they pertain to the understanding of the invention, but still will not be able to capture all of the details and complexities of the operating system itself.

In Microsoft Windows, for example, the translation of filename to start sector is in the master file table (MFT) or file allocation table (FAT). In Microsoft Windows, the LBA and HBA corresponding to zero and low-numbered addresses are boot sectors (and thus not used for data) and in our description we have ignored this. In several examples and figures, in order to simplify and clarify our explanations, we have used example sectors whose addresses would normally correspond to boot sectors.

As another example of an area where we were forced to simplify our explanations for clarity, the NT filesystem (or NT file system, NTFS) in a Windows OS uses a more complex map than we have shown in, for example, FIG. 5 and we describe some of the basic differences next. NTFS uses disk clusters or clusters as the basic unit of storage. A cluster may span one or more disk sectors and data in a file spans one or more clusters on disk. Clusters may not be physically contiguous but are logically contiguous. When NTFS reads from or writes to a disk it uses at least one cluster. A cluster is addressed using a Logical Cluster Number (LCN). NTFS addresses the logical clusters belonging to a file using a Virtual Cluster Number (VCN). NTFS manages clusters using a run (or extent). A run is a set of one or more clusters with contiguous LCNs. A run is addressed using the starting LCN and the count of clusters in that run. A file is a list of LCN and count pairs that address the runs in which the file data is stored. NTFS must translate a byte offset (or offset) into a file to an LCN. The offset into a file is converted to a VCN by dividing the offset by the cluster size. NTFS stores a VCN to LCN mapping. NTFS maps the start of cluster 0 to volume logical sector 0, thus the map from logical clusters to LBA (or HBA) is straightforward (but can be complex in multi-volume or RAID arrays, for example). The map(s) and other important data are stored on disk in the MFT in records. The data section of an MFT record contains the locations in the main data portion of the disk volume where the file may be found. Each of these locations is defined by a VCN, LCN, and number of clusters.

Thus an offset into a file is mapped to File Virtual Clusters which are mapped to File Logical Clusters which are mapped to the Physical Disk Clusters. If, for example, a file test.txt was fragmented into four pieces, the MFT record for test.txt will contain four VCNs (1, 2, 3, 4). If the first run begins at cluster 997 and includes clusters 998 and 999, the MFT will list VCN=1, LCN=997, clusters=3. The three other runs in the file would be addressed similarly. Thus the mapping of Windows, as we explained, is more complex than that shown in FIG. 5, but identical in the basic idea (and other operating systems have similar differences, but still similar in the basic idea). A very crude analogy would be the postal system: in our examples we have described the use of one level of mapping in the host, that is we give everyone our street address; you could consider that Windows gives everyone a PO Box address (one reason being that if you move, you don't need to tell everyone you have changed your address). In the end, mail still arrives at the destination, whether we use a PO Box or not; and in the same way, despite which OS is used, ultimately the OS must create an LBA as an address to a disk. It is at that point in the system that we are able to add a storage array controller to perform the functions described here.

Garbage Collection with an Unused Portion of a Disk

Figure 11:
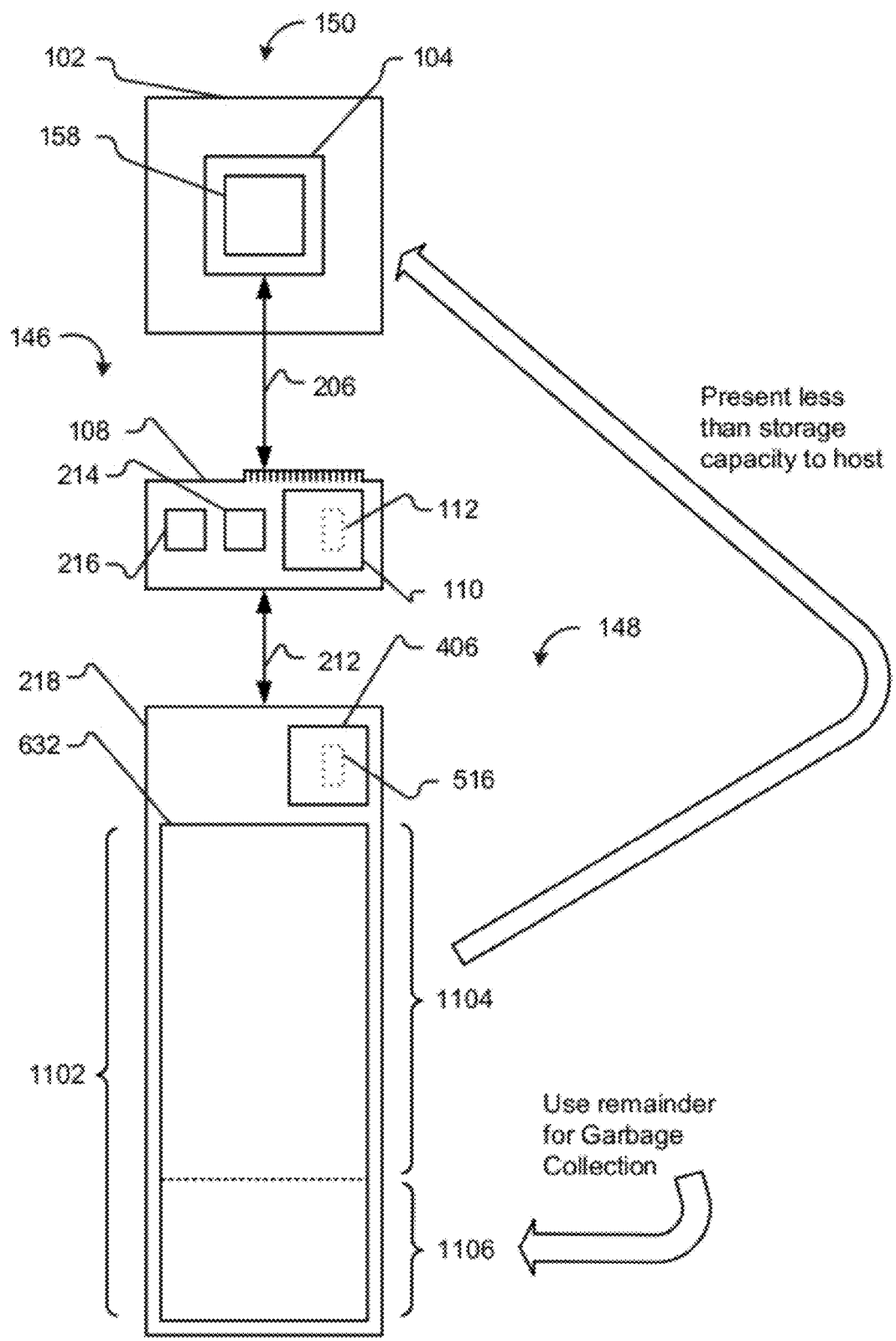
FIG. 11 (block diagram) shows a storage array controller that performs garbage collection.

In FIG. 11 (block diagram), Storage Array Controller 108 controls a storage array comprising a Solid-State Disk 218 and instructs Solid-State Disk 218 to present a Storage Capacity C2 1104 that is less than the Storage Capacity C1 1102 of Solid-State Disk 218.

In FIG. 11, Storage Array Controller 108 uses Storage Capacity C3 1106, which is equal to Storage Capacity C1 1102 minus Storage Capacity C2 1104, to perform garbage collection. As an example, if Solid-State Disk 218 is 64 GByte, the Storage Array Controller 108 may use 8 GByte for Storage Capacity C3 1106. The ability to use 8 GBytes of storage for copying, moving, erasing and other operations performed during garbage collection allows the Storage Array Controller 108 to perform garbage collection much more efficiently than the Solid-State Disk 218, for example. It should be noted that the area used by Storage Capacity C3 1106 may not be fixed or indeed remain in a contiguous region (both might be inferred from FIG. 11), but may be (and typically is) constantly changing in its makeup and physical location as blocks are copied, and/or moved and/or erased.

Note that in FIG. 11 Storage Capacity C1 1102 of Solid-State Disk 218 may be the storage capacity reported by the Solid-State Disk Controller Chip 406. The actual physical storage capacity of the Solid-State Disk 218 may be C4 that may be greater than Storage Capacity C1 1102 (i.e. the Solid-State Disk Controller Chip 406 may report less than the actual physical storage capacity).

In alternative embodiments: (a) Storage Capacity C3 1106 may be spread across one or more Solid-State Disk 218 in Storage Array 148; (b) one area corresponding to Storage Capacity C3 1106 on a single Solid-State Disk 218 may be used by Storage Array Controller 108 for garbage collection across one or more Solid-State Disk 218 in Storage Array 148; (c) Storage Capacity C3 1106 may be varied according to (i) size of Storage Array 148; (ii) performance required from Solid-State Disk 218 in Storage Array 148; (iii) performance required from Storage Array 148; (iv) performance and/or other characteristics of Storage Array 148; (v) size of Solid-State Disk 218; (d) Storage Capacity C3 1106 may be varied dynamically based on space available or other criteria (performance, load, data patterns, use, etc.); (e) wear-level of Solid-State Disk 218 (e.g. length of use and/or service, amount of data written, etc.).

Write Sequentialization in a RAID Array

Figure 12:
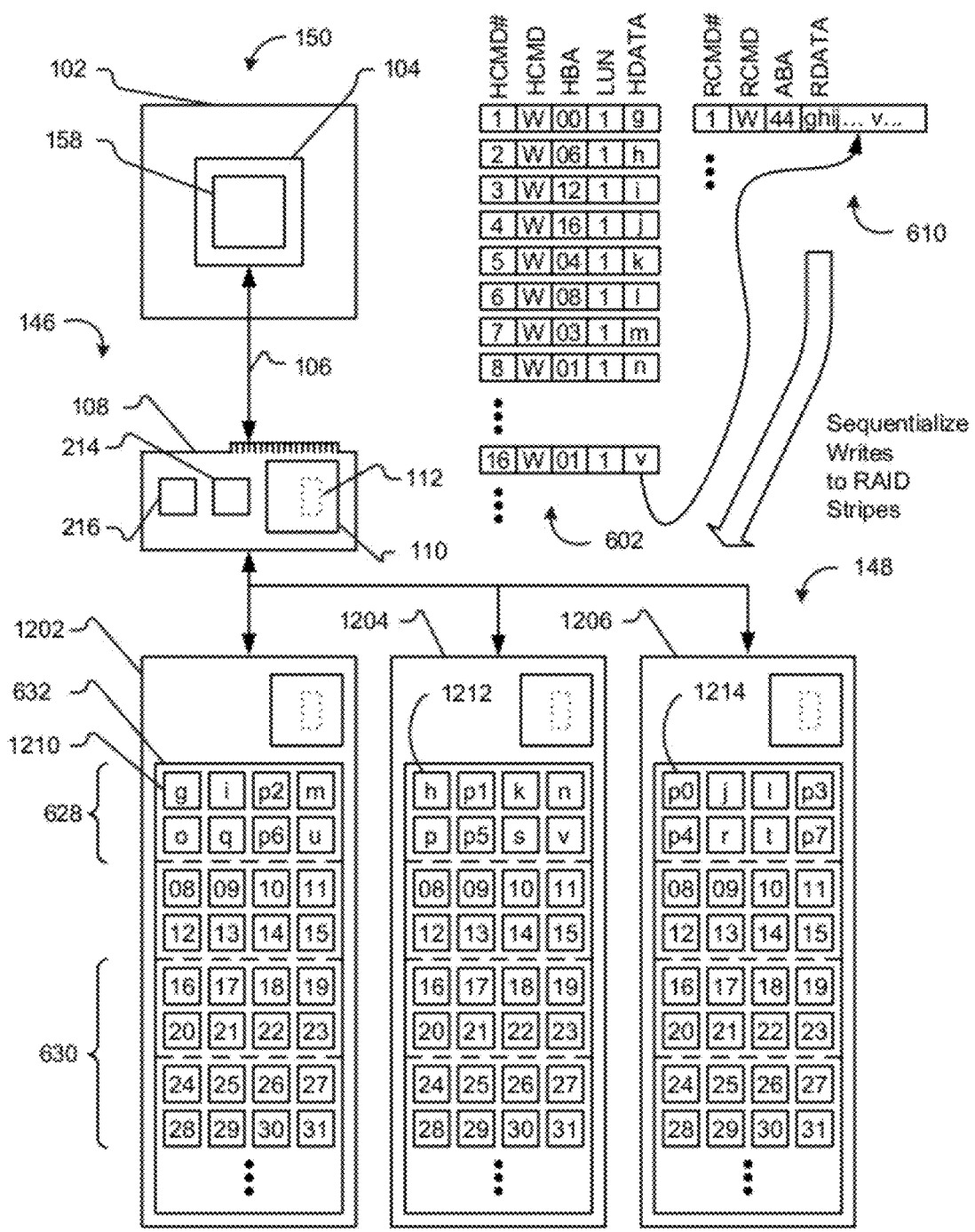
FIG. 12 (block diagram) shows a storage array controller that sequentializes writes across a storage array to avoid inefficient small writes.

In FIG. 12 (block diagram), Storage Array Controller 108 sequentializes writes across a storage array to avoid inefficient small writes.

RAID (Redundant Array of Independent Disks or Redundant Array of Inexpensive Disks) provides increased storage reliability through redundancy by combining multiple disk drives in a storage array into a disk group or volume group. RAID distributes data across multiple disk drives, but the storage array is addressed by the operating system as a single disk. The segment size is the amount of data written to a single drive in a physical (or virtual) disk group before writing data to the next disk drive in the disk group. A set of contiguous data segments that spans all members of the disk group is a stripe.

A RAID-5 storage array uses sector-level striping with parity information distributed across all member disks. RAID 5 may be implemented in: (a) the disk controller; (b) a storage array controller (or other types of RAID cards with onboard processors, etc.); (c) operating systems independently of the disk controller, RAID controller, etc. (known as software RAID) e.g. Microsoft Windows Dynamic Disks, Linux and RAID, RAID-Z, etc; (d) the system CPU in conjunction with a RAID controller (a form of software RAID); (e) a combination of one or more these.

For example, in a RAID 5 storage array with 5 member disks in a disk group (4 data+1 parity) using a segment size of 128 kBytes, the first 128 kBytes of a large write command is written to the first drive, the next 128 kBytes to the next drive, and so on. The stripe size is the length of a stripe, in this case 512 kBytes (4 times 128 kBytes). (Sometimes stripe and stripe size are used or defined to include the parity information, but we will not use this alternative definition.) For a RAID 1 array, with a 2+2 disk group, 128 kBytes would be written to each of two drives and same data to the mirrored drives. If the write command size is larger than the stripe size, writes repeat until all data is written to the storage array.

A full write is the most efficient type of write that can be performed corresponding to writing an entire stripe of data. A partial write occurs when less than a full stripe of data is modified and written. In RAID levels 5 and 6 the situation is complex, as parity data must be recalculated and written for a whole stripe. For small writes, this requires a multi-step process to: (a) read the old data segments and read the old parity segment; (b) compare the old data segments with the write data and modify the parity segment; (c) write the new data segments and write the new parity segment. This read-modify-write (RMW) multi-step process for writes smaller than the stripe size is inefficient and slow. A RMW also increases the number of disk writes compared to a full write and thus increases wear on flash memory in an SSD for example.

One weakness of RAID-5 systems occurs in the event of a failure while there are pending writes (potential lost writes). In such a failure event the parity information may become inconsistent with the associated data in a stripe. Data loss can then occur if a disk fails when the incorrect parity information is used to reconstruct the missing data from the failed disk. This vulnerability is known as a write hole. A battery-backed write cache (BBWC) is commonly used in a RAID controller to reduce the probability for this failure mechanism to occur.

In FIG. 12, Storage Array 148 comprises a RAID-5 array. In FIG. 12, Storage Array 148 comprises: Solid-State Disk 0 1202, Solid-State Disk 1 1204, Solid-State Disk 2 1206. In FIG. 12, Sector 00 Disk 0 1210 is the first sector on Solid-State Disk 0 1202; Sector 00 Disk 1 1212 is the first sector on Solid-State Disk 1 1204; Sector 00 Disk 2 1214 is the first sector on Solid-State Disk 2 1206. Sector 00 Disk 0 1210 contain data (g, written by Computer System 150); Sector 00 Disk 1 1212 contains data (h, written by Computer System 150); Sector 00 Disk 2 1214 contains parity information (p0) constructed from data in Sector 00 Disk 0 1210 and Sector 00 Disk 1 1212.

In FIG. 12, Storage Array Controller 108 sequentializes writes (as has been described, for example, using the embodiments shown in FIG. 6 and FIG. 10). By converting large numbers of small random writes, which may be less than the stripe size, to one or more sequential writes that are larger than the stripe size (i.e. full writes), Storage Array Controller 108 avoids the RMW that would otherwise occur.

In FIG. 12, Host Write Commands 602 comprise: write HCMD=1 contains data g; write HCMD=2 contains data h; parity p0 is constructed from g and h (by means described above). If these Host Write Commands 602 are less than the stripe size, they would result in RMW. In FIG. 12, Storage Array Controller 108 sequentializes Host Write Commands 602 to Disk Commands 610. Disk Commands 610 correspond to write commands that are larger than the stripe size, and thus avoid RMW.

Thus, in FIG. 12, Storage Array Controller 108 sequentializes writes across Storage Array 148 to avoid RMW on small writes (writes that are less than the stripe size) in RAID-5 arrays.

In other embodiments: (a) the use of buffers (e.g. Superblock 914 in FIG. 9), the method of sequentialization (i.e. how commands are sequentialized), and other functions etc. described may be more complex than shown in FIG. 12, which has been simplified to show the basic idea with clarity; (b) more than three disks may be used in a RAID-5 array, as is well-known by one skilled in the art; (c) Storage Array Controller 108 may construct the parity information (or other methods and/or means described previously may be used); (d) combinations of one or more of these and/or previously described alternative embodiments.

In still other embodiments: (a) a RAID array may be formed using one or more portions of a single disk or storage device (SSD, HDD, etc.); (b) the Storage Array 148 may use nested RAID, i.e. (i) one RAID level within one or more disks (intra-disk RAID) and (ii) the same or different RAID level across disks (inter-disk RAID); (c) disks may be used in a disk pool that is a subset of Storage Array 148, so that a stripe is not across all disks in the array; (d) the Storage Array Controller 108 may be used to reduce or eliminate any write-hole weakness or vulnerability in a RAID array by using onboard DRAM, flash, or other means to prevent or reduce the probability of lost writes or inconsistent parity information, etc; (e) one or more alternative RAID levels or configurations may be used (including more than one configuration or level in combination) in Storage Array 148 (or portions of Storage Array 148) such as: (i) combinations of RAID levels (e.g. RAID 50, RAID 10, etc.); (ii) distributed parity; (iii) non-distributed parity; (iv) left asymmetric algorithm, left symmetric algorithm, right asymmetric algorithm, right symmetric algorithm (these algorithms are well known to one skilled in the art), etc; (f) a mixture of different storage devices with different size or type may be used in Storage Array 148 (e.g. zero, one or more SSD; zero, one or more HDD; zero, one or more other storage devices, etc.); (g) Storage Array Controller 108 may use an SSD (or onboard memory, cache, other storage device, etc.) as storage cache (or other form of staging storage or cache) for Storage Array 148; (h) the embodiment described in (g) or other embodiments may also have the Storage Array 148 (or portions of Storage Array 148) be protected (by RAID or other means); (i) combinations of one or more of these and/or previously described alternative embodiments.

Writes of Varying Lengths

Figure 13:
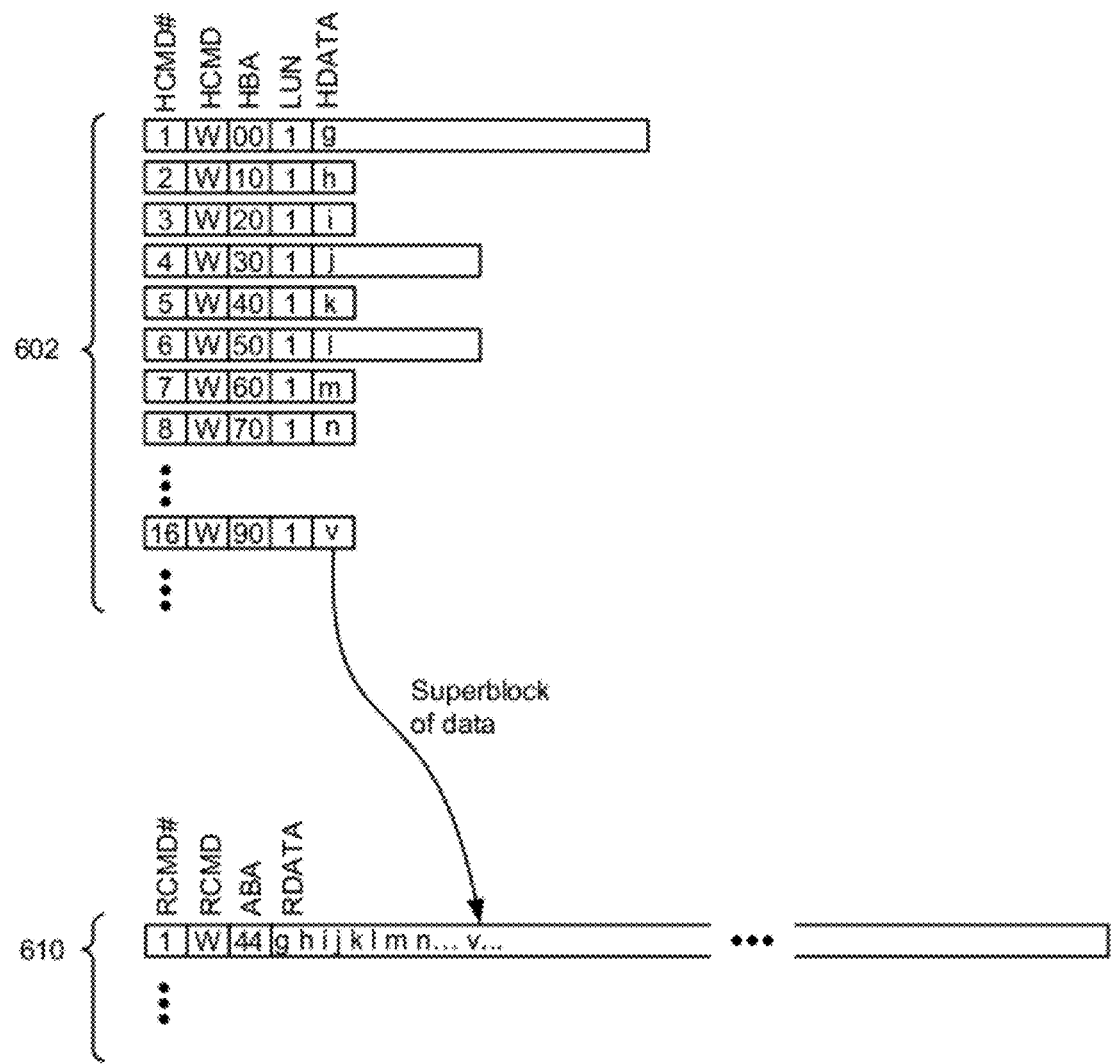
FIG. 13 shows host write commands that write different amounts of data sequentialized by a storage array controller.

In FIG. 13, Host Write Commands 602 show host write commands of different sizes (that is write commands that write different amounts of data, represented by the different lengths of the HDATA field). In previous figures and in the text we have often simplified the drawings and examples such that they may imply that writes are of similar size. In practice if one were to observe such commands on a bus, host write commands may be of vastly varying size (e.g. a write of 4 kBytes might be followed by a write of 64 kBytes etc.). This does not affect the basic idea behind any of the embodiments described. In FIG. 13, for example, Host Write Commands 602 are still sequentialized to Disk Commands 610 using a Superblock of data.

Write Aggregation

Figure 14:
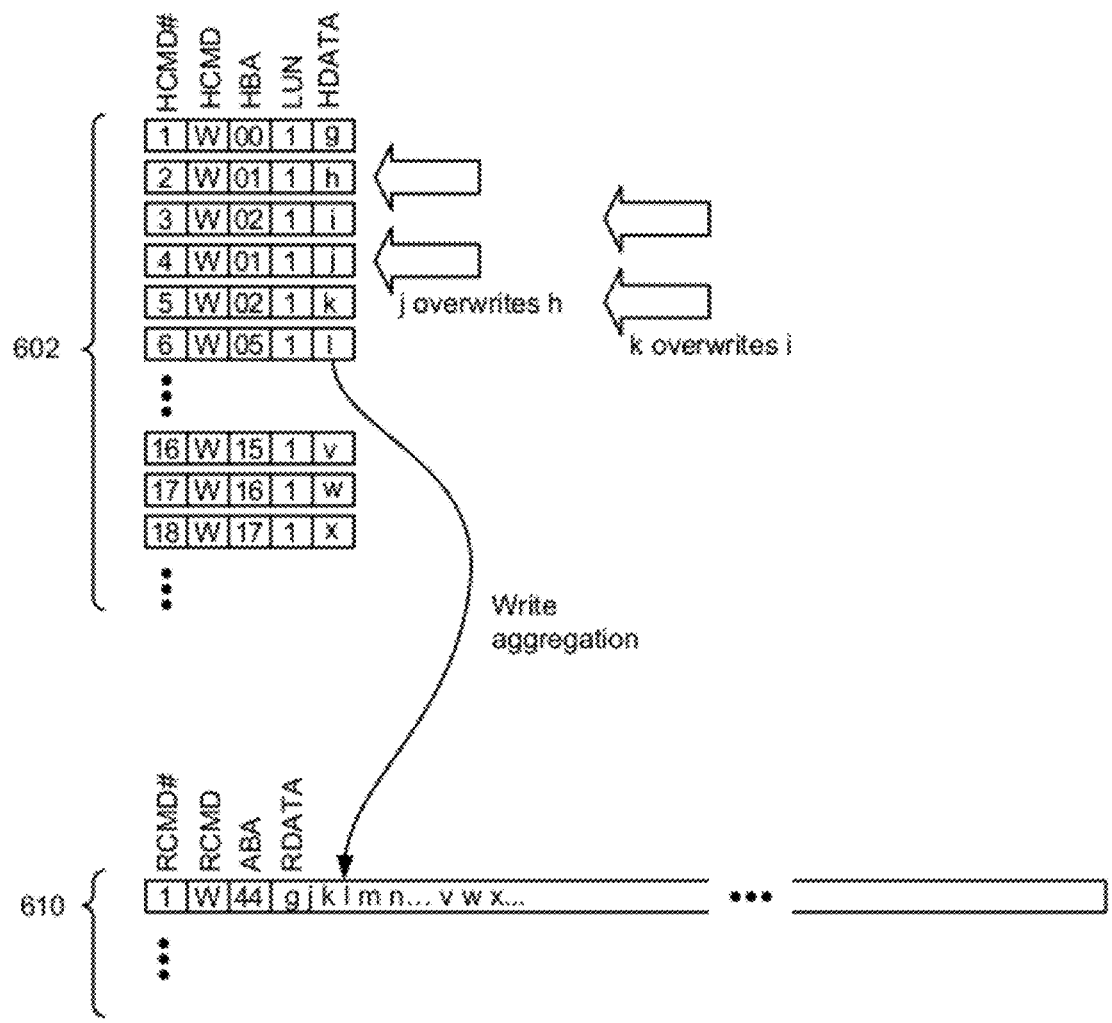
FIG. 14 shows write aggregation by a storage array controller.

In FIG. 14, Host Write Commands 602 show host write commands to identical locations (HBAs). For example, HCMD=2 writes data h to HBA=01, then HCMD=4 writes data j to HBA=01. As a second example, HCMD=3 writes data i to HBA=02, then HCMD=5 writes data k to HBA=02.

In previous figures and in the text we have often simplified the drawings and examples and ignored this complication, which may often occur in practice, in order to clarify the description. If one were to observe write commands on a bus, host write commands may often over-write each other. Storage Array Controller 108 may collapse or aggregate these writes, as shown in FIG. 14, and in the resulting Disk Commands 610. This write aggregation is a benefit of using the Storage Array Controller 108 and reduces the number of writes, which is beneficial to the performance of any disk array but also prolongs the life of an SSD, for example. Write aggregation does not affect the basic idea behind any of the embodiments described. In FIG. 14, for example, Host Write Commands 602 are still sequentialized (and now aggregated) to Disk Commands 610 using a Superblock of data.

Balanced Writes

Figure 15:
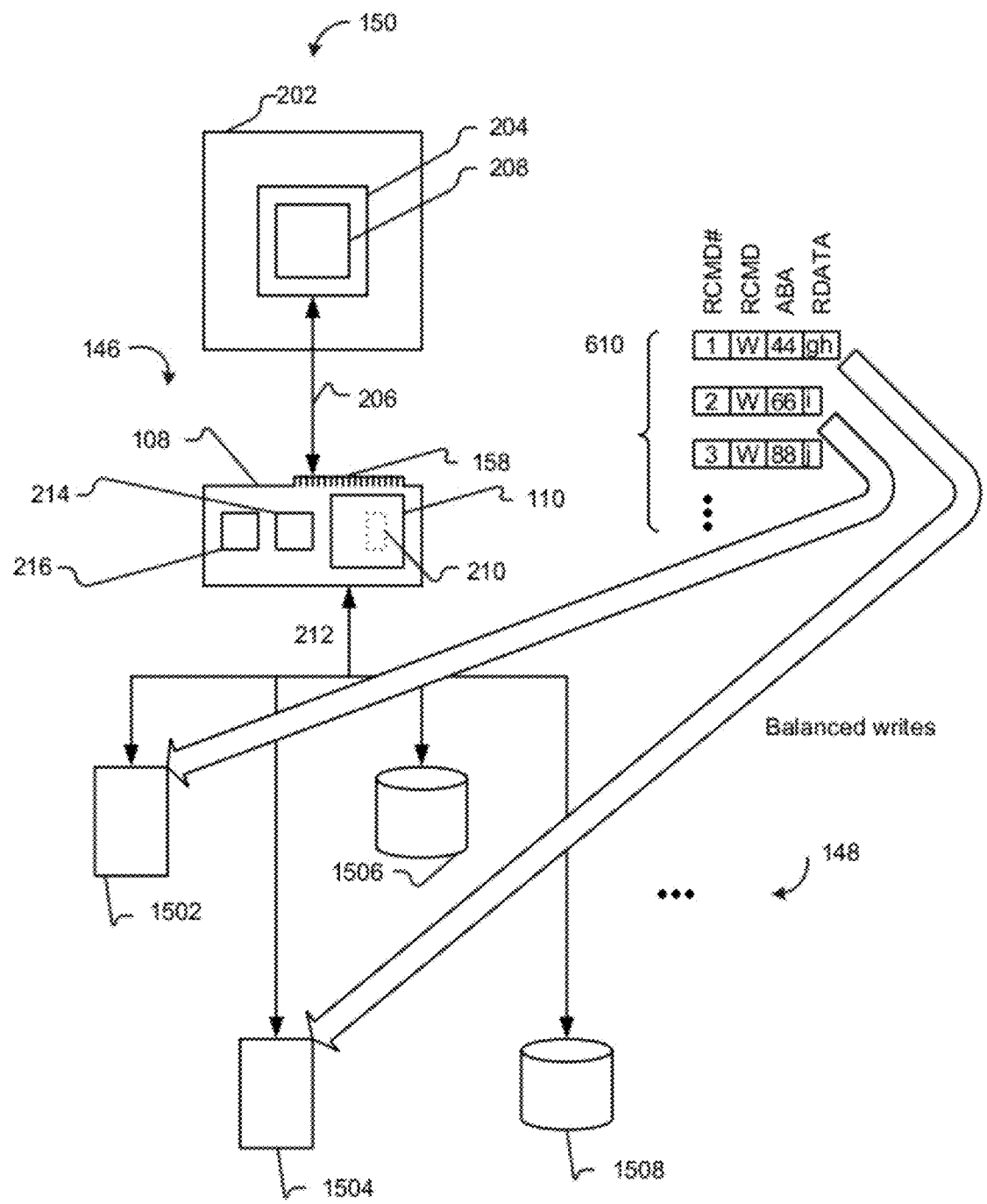
FIG. 15 (block diagram) shows a storage array controller that performs data streaming.

In FIG. 15, Storage Array Controller 108 balances (e.g. steers, directs, etc.) the writes in Disk Commands 610 between SSD 0 1502 and SSD 1 1504. Thus for example, suppose that RCMD#=1 is a write that contains twice as much data (RDATA=gh) as does RCMD#=2 (RDATA=i) and RCMD#=3 (RDATA=j). Then Storage Array Controller 108 directs RCMD#=1 to SSD 0 1502 and RCMD#=2 and RCMD#=3 to SSD 1 1504. In alternative implementations: (a) all writes in Disk Commands 610 may be the same size (e.g. a superblock, or other fixed size, etc.), then writes may be balanced by an arbitration scheme (e.g. round-robin, weighted (e.g. by data type, file type, file size, or other criteria, etc.), fair, other well-known arbitration algorithm, etc.) to a group (all, or one or more, a mix of SSD and HDD, etc.) of storage devices in Storage Array 148; (b) writes may only be balanced to the solid-state storage devices in Storage Array 148, or may be balanced between SSD and HDD (e.g. to reduce SSD wear (also known as wear-leveling), reserve and/or conserve SSD space, manage disk quotas, etc.); (c) data may be balanced (or re-balanced, i.e. balanced more than once, data copied between storage devices more than once, etc.) between storage devices in Storage Array 148, that is data may be moved by Storage Array Controller 108 between storage devices independently of commands from Host System 202 (e.g. to equalize space, to increase spare area on one or more SSDs, to improve the ability of one or more SSDs to perform garbage collection, to provide thin provisioning, to manage the storage array, to react to imminent failure of a storage device, to manage RAID levels, to change RAID levels, to re-build a RAID set, to maintain "hot" data (frequently used data) separately from "cold" data, etc.) (d) Host System 202 may already be capable of balancing writes to Storage Array 148, but Storage Array Controller 108 with more information available may re-balance writes within the Storage Array 148 (e.g. to improve performance, reduce wear on an SSD, etc.); (e) writes may be balanced based on factors other than the data size: e.g. data type (e.g. sparse, dense, compressed, video, file size, file type, etc.), "hot"/"cold" data, importance, frequency of use, latency of access required, bandwidth of access required, access patterns (e.g. sequential (e.g. consecutive, a string, one after another, contiguous, etc.), random (e.g. random addresses, out of order addresses, etc.), stride patterns (e.g. regular or otherwise recognizable repeating access pattern or addresses, etc.) detected, etc.); (f) any combination of one or more of these and/or previous embodiments.

Data Scrubbing

In FIG. 15 (as well as other embodiments described here), Storage Array Controller 108 may scrub data on one or more of the storage devices in Storage Array 148. Data scrubbing (also sometimes called data cleansing, though that term is ambiguous since it is also used to mean sanitization of data) is the process of checking data and then correcting, changing or removing any data that is incorrect, incomplete, improperly formatted, or otherwise in error (some extend the definition to elimination of duplicated data, often called de-duplication or de-dup). Typically data scrubbing is performed using a background task and an error correction technique (e.g. using redundant information in such techniques as RAID, parity, CRC, ECC, other coding techniques, etc.) to periodically inspect data for errors, and then corrects the error using correction algorithms (and the redundant information) or by using another copy of the data. Data scrubbing may be especially beneficial for solid-state storage devices that have poor data retention properties and are subject to errors due to processes such as read disturb, write disturb, etc. Data scrubbing reduces the likelihood that correctable errors will accumulate and form uncorrectable errors. Thus data scrubbing can reduce the risk of uncorrectable errors. Because of its position in the storage hierarchy Storage Array Controller 108 is able to scrub data independently of Host System 202 (which may have an OS that does not support data scrub, for example). Storage Array Controller 108 is also able to scrub data while and in addition to performing data re-balancing for example (i.e. scrub data as it is being transferred between storage devices, etc.).

Data Manipulation

In FIG. 15 (as well as other embodiments described here), Storage Array Controller 108 may perform data manipulation (e.g. compression, decompression, de-duplication, virus detection and/or scan, etc.) as it reads and/or writes data to/from Storage Array 148 under control of commands from Host System 202. Storage Array Controller 108 because of its position in the storage hierarchy is also able to perform such data manipulation independently of Host System 202.

Data Streaming

In FIG. 15 (as well as other embodiments described here), Storage Array Controller 108 may stream data directly to and from CPU 204 bypassing software (e.g. Operating System 208, any host-based driver software, storage management framework, file system layer, etc.) and/or hardware layers that may reduce performance or cause other issues (e.g. added latency, reduced data reliability, etc.).

Write Commit

In FIG. 15 (as well as other embodiments described here), Storage Array Controller 108 may complete writes and/or commit writes to one or more storage devices in Storage Array 148. Normally in a storage subsystem, the Host System 202 and Operating System 208 is not informed that a write has completed (i.e. guaranteed to be written to a storage device) until the storage device has committed (i.e. guaranteed that data will be written) that the write will complete. Storage Array Controller 108 may use Storage Array Controller Flash Chip 214 and/or Storage Array Controller DRAM Chip 216 (and/or other storage, memory, etc.) as a cache or staging storage to improve the speed of a storage subsystem. Storage Array Controller 108 may then complete writes and/or commit writes by copying write data to the fast staging storage and later copying (also known as de-staging) data to one or more, possibly slower, storage device in Storage Array 148. It is important that data in the staging storage not be lost on system failure since that data has already been committed to Host System 202. In alternative implementations: (a) Storage Array Controller DRAM Chip 216 may be battery-backed; (b) a supercapacitor may be used to provide power to any volatile storage on Storage Array Controller 108; (c) Storage Array Controller 108 may be remote from Host System 202 (i.e. IO Bus 206 may be a network, PCIe, Internet, Ethernet, Fibre Channel, FCoE, QuickPath, etc.); (d) Storage Array 148 may be remote from Host System 202 (i.e. Storage Bus 212 may be a network, Internet, Ethernet, Fibre Channel, FCoE, QuickPath, etc.); (e) staging storage (i.e. Storage Array Controller Flash Chip 214, Storage Array Controller DRAM Chip 216, other storage, memory, combination of these, etc.) may be remote from Host System 202 or from Storage Array Controller 108; (f) a combination of one or more of these or previously described embodiments.

Conclusion

Numerous variations, combinations, and modifications based on the above description will become apparent to someone with skill in the art once the above description is fully understood. It is intended that the claims that follow be interpreted to embrace all such variations, combinations, and modifications.

| REFERENCE SIGNS LIST | |
|---|---|
| 108 | Storage Array Controller |
| 110 | Storage Array Controller Chip |
| 146 | Storage Bus Connector |
| 148 | Storage Array |
| 150 | Computer System |
| 154 | Hard Disk Drive |
| 156 | Storage Bus Connector |
| 158 | IO Bus Connector |
| 202 | Host System |
| 204 | CPU |
| 206 | IO Bus |
| 208 | Operating System |
| 210 | Storage Array Controller Logic |
| 212 | Storage Bus |
| 214 | Storage Array Controller Flash Chip |
| 216 | Storage Array Controller DRAM Chip |
| 218 | Solid-State Disk |
| 302 | Storage Array Controller DIMM |
| 402 | Solid-State Disk Flash Chip |
| 404 | Solid-State Disk DRAM Chip |
| 406 | Solid-State Disk Controller Chip |
| 408 | Solid-State Disk Connector |
| 512 | Host Filesystem Logic |
| 514 | Host Filesystem Map |
| 506 | Host Filesystem Freelist |
| 508 | Storage Array Controller Map |
| 510 | Storage Array Controller Freelist |
| 512 | Solid-State Disk Map |
| 514 | Solid-State Disk Freelist |
| 516 | Solid-State Disk Logic |
| 602 | Host Write Commands |
| 604 | Hard Disk Drive Platter |
| 606 | Hard Disk Drive Write Sequence |
| 608 | Hard Disk Drive Sector Location |
| 610 | Disk Commands |
| 620 | Sectors |
| 622 | Sector 00 |
| 624 | Sector 07 |
| 626 | Sector 31 |
| 628 | Flash Page |
| 630 | Flash Block |
| 632 | Flash Memory |
| 704 | Hard Disk Drive Platter |
| 706 | Hard Disk Drive Write Sequence |
| 708 | Hard Disk Drive Sector Location |
| 804 | 64-Gbit Flash Devices |
| 806 | 4-Mbyte Flash Blocks |
| 808 | 8-kbyte Flash Pages |
| 810 | 512-byte Disk Sectors |
| 914 | Superblock |
| 1012 | Flash Write Sequence |
| 1014 | Start of Superblock |
| 1016 | End of Superblock |
| 1102 | Storage Capacity C1 |
| 1104 | Storage Capacity C2 |
| 1106 | Storage Capacity C3 |
| 1202 | Solid-State Disk 0 |
| 1204 | Solid-State Disk 1 |
| 1206 | Solid-State Disk 2 |
| 1210 | Sector 00 Disk 0 |
| 1212 | Sector 00 Disk 1 |
| 1214 | Sector 00 Disk 2 |
| 1502 | SSD 0 |
| 1504 | SSD 1 |
| 1506 | HDD 0 |
| 1508 | HDD 1 |

What we claim is:

1. A storage array controller operable to be coupled to a host system;
    wherein the storage array controller controls a storage array;
    wherein the storage array comprises a plurality of solid-state disks;
    wherein the plurality of solid-state disks form a RAID array;
    wherein the storage array controller creates a map to perform data manipulation across at least one of the plurality of solid-state disks;
    wherein the storage array controller includes an operating system;
    wherein the operating system is operable to alter the map of one or more input addresses to one or more output addresses;
    wherein the storage array controller uses the map to map addresses between one or more host commands and one or more disk commands;
    wherein the storage array controller is operable to perform one or more re-mapping operations between the host system and the storage array;
    wherein the storage array controller is operable to use a freelist of addresses that are free to be used. wherein one or more garbage collection operations are performed by the storage array controller independently from the host system;
    and wherein the storage array controller is operable to perform the map of input addresses to output addresses while performing one or more garbage collection operations.

2. The storage array controller of claim 1 wherein the input addresses and/or output addresses may be blocks and/or sectors.

3. The storage array controller of claim 1 wherein one or more of the one or more garbage collection operations are further performed by the storage array controller issuing one or more disk trim commands issued to the plurality of solid-state disks; and wherein one or more of the one or more disk trim commands are generated independently from the host system.

4. The storage array controller of claim 1;
    wherein the storage array controller is further operable to perform the map of input addresses to output addresses while performing one or more operations to reduce wear;
    and wherein the operations to reduce wear include the balancing and re-balancing of data across one or more of the plurality of solid-state disks.

5. The storage array controller of claim 4 wherein the re-balancing of data includes moving one or more areas of hot data from a first solid-state disk to a second solid state disk.

6. The storage array controller of claim 1 wherein the storage array controller is further operable to perform the map of input addresses to output addresses while performing one or more operations to balance spare capacity.

7. The storage array controller of claim 6 wherein the balancing of spare capacity includes altering the map so that a first solid-state disk that has a nearly full capacity and a second solid-state disk that has a unused capacity are balanced so that the first solid-state disk and the second solid-state disk have the same or nearly the same spare capacity.

8. The storage array controller of claim 1;
wherein the RAID array is a RAID5 array;
wherein the storage array controller is further operable to perform the map of input addresses to output addresses while performing one or more operations to sequentialize writes;
and wherein the storage array controller is operable to perform one or more write commands in units of the RAID5 stripe size without using a read-modify-write operation.

9. The storage array controller of claim 1;
wherein the storage array controller is operable to stream data directly to and from the host system and wherein the streaming of data bypasses one or more host system hardware layers and/or one or more host software driver layers.

* * * * *